United States Patent

Natarajan et al.

(10) Patent No.: US 10,268,578 B1
(45) Date of Patent: Apr. 23, 2019

(54) DATA PRESERVATION AND RECOVERY IN A MEMORY COMPONENT

(71) Applicant: INTEL CORPORATION, Santa Clara, CA (US)

(72) Inventors: Shankar Natarajan, Santa Clara, CA (US); Aliasgar S. Madraswala, Folsom, CA (US); Wayne D. Tran, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/721,237

(22) Filed: Sep. 29, 2017

(51) Int. Cl.
*G06F 3/06* (2006.01)
*G06F 12/0804* (2016.01)

(52) U.S. Cl.
CPC .......... *G06F 12/0804* (2013.01); *G06F 3/065* (2013.01); *G06F 3/068* (2013.01); *G06F 3/0619* (2013.01); *G06F 2212/1024* (2013.01); *G06F 2212/205* (2013.01)

(58) Field of Classification Search
USPC .......................................................... 711/143
See application file for complete search history.

(56) References Cited

U.S. PATENT DOCUMENTS

| | | | | | |
|---|---|---|---|---|---|
| 5,590,080 | A | * | 12/1996 | Hasagawa | G11C 11/4091 365/201 |
| 5,828,612 | A | * | 10/1998 | Yu | G11C 7/12 365/203 |
| 6,212,609 | B1 | * | 4/2001 | Abramson | G06F 1/30 711/102 |
| 6,473,843 | B2 | * | 10/2002 | Abramson | G06F 1/30 711/161 |
| 9,305,655 | B2 | * | 4/2016 | Phan | G11C 16/225 |
| 2007/0165482 | A1 | * | 7/2007 | Asauchi | G06F 21/79 365/239 |
| 2009/0228739 | A1 | * | 9/2009 | Cohen | G06F 11/1072 714/6.12 |
| 2014/0006688 | A1 | * | 1/2014 | Yu | G11C 16/10 711/103 |
| 2014/0304456 | A1 | * | 10/2014 | Narasimha | G06F 12/0246 711/103 |
| 2014/0304560 | A1 | * | 10/2014 | Narasimha | G06F 11/0727 714/704 |
| 2015/0117107 | A1 | * | 4/2015 | Sun | G11C 16/10 365/185.12 |
| 2016/0027511 | A1 | * | 1/2016 | Baumann | G11C 14/0063 711/103 |
| 2016/0313943 | A1 | * | 10/2016 | Hashimoto | G06F 3/061 |

* cited by examiner

*Primary Examiner* — Mano Padmanabhan
*Assistant Examiner* — Jean C Edouard
(74) *Attorney, Agent, or Firm* — Konrad Raynes Davda & Victor LLP

(57) ABSTRACT

In one embodiment, a nonvolatile memory of a component such as a storage drive preserves write data in the event of a write data programming failure in the memory. Write data is preserved in the event of cached writes by data preservation logic in registers and data recovery logic recovers the preserved data and outputs the recovered data from the storage drive. Other aspects are described herein.

22 Claims, 11 Drawing Sheets

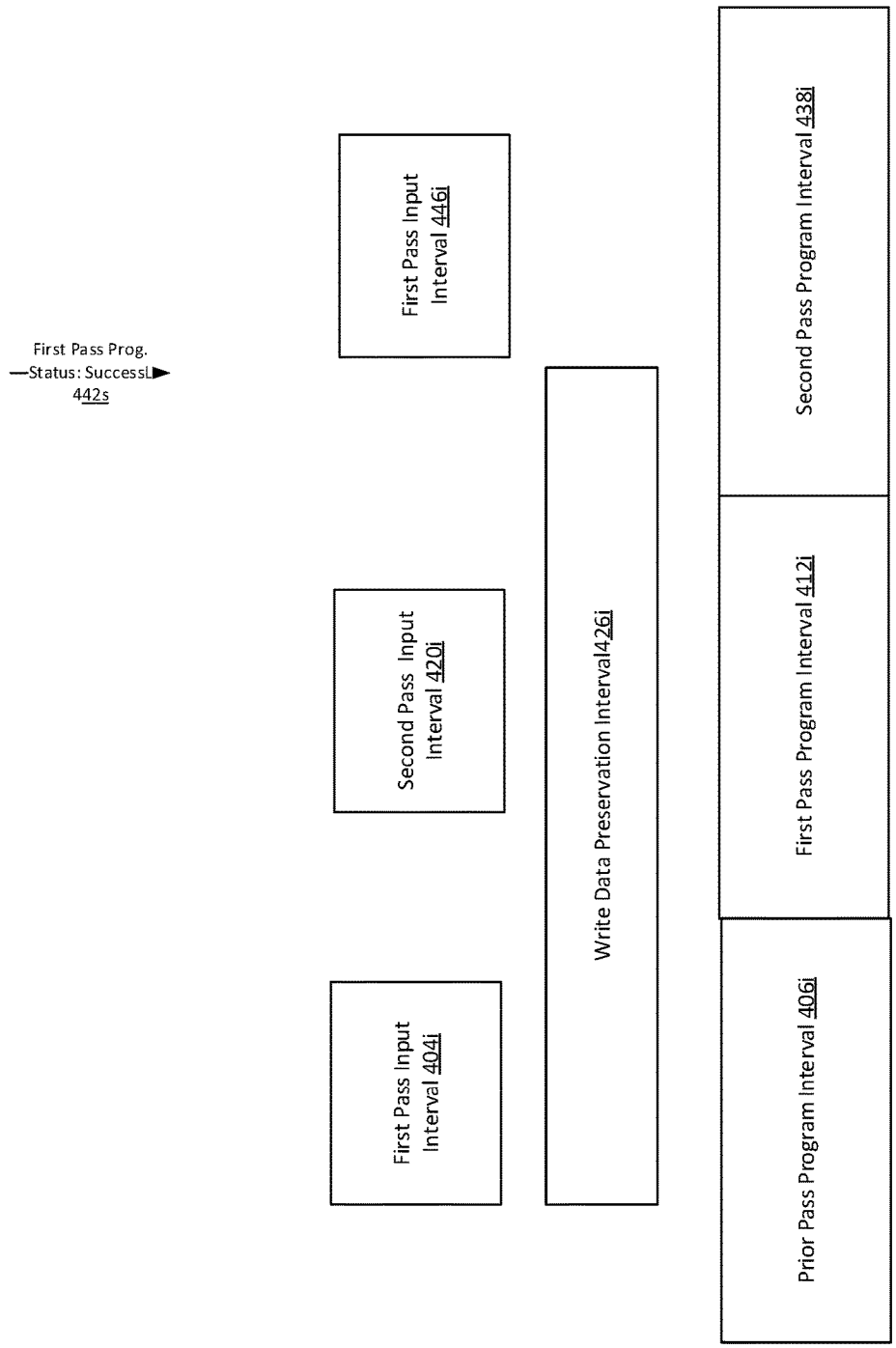

DATA PRESERVATION AND RECOVERY IN A MEMORY COMPONENT

TECHNICAL FIELD

Certain embodiments of the present invention relate generally to storage drives and memory modules having a non-volatile storage memory.

BACKGROUND

A memory component such as a storage drive typically has nonvolatile storage memory also referred to as persistent storage memory, which retains data stored in the memory notwithstanding a power loss to the storage drive. Nonvolatile storage memory may also be packaged in memory modules such as dual-inline memory modules (DIMM), for example.

The capacity of such nonvolatile storage memory continues to grow. For example, Intel's three dimensional (3D) quad level cell (QLC) NAND memory has a capacity of 128 Gigabytes (GB). As such, the need to reduce the amount of time needed to write data to the memory, that is, "program" the memory, is growing as well. The process of writing data to the memory typically includes an initial data input phase or interval in which the memory component inputs a set of data such as a page of data, for example, which has been output by a processor or other external controller, and then programs in a programming interval, a bitcell array of the memory component with the page of inputted data. Thus, the total time to input and program write data in the memory component may be the sum of the data input interval and the data program interval.

One approach to reducing write data process time is to program the bitcell array with one page (the "current" page) of previously input data while at the same time, caching the next page of input data in internal latches or registers in anticipation of the next data programming interval. Thus, the programming interval of the current page of data overlaps with the data input and caching interval of the next page of data. In some nonvolatile storage memory, the bitcell array may be programmed faster than the time needed to input and cache the next page of input data. As a result, the total write process time for each page of data is reduced to the data input and caching interval. Such an approach may improve overall performance of the memory component by as much as 30% in some cases.

In one known design, a solid state drive has a cache register or latch which latches a page of write data from an external processor or controller. The page of write data is then transferred to a write data register prior to programming the bitcell array with the page of write data. The next page of write data may be cached in the cache register while the first page of write data is written to the array. A solid state drive may have several such data registers for a variety of purposes. For example, in multiple level cells (MLC) having multiple bits per bitcell, the solid state drive may have multiple write data registers (such as five, for example, in a quad level cell (QLC)) to support programming MLC bitcells.

In some nonvolatile memory components, a failure in the programming interval of a page of data may lead to loss of some or all of that page of data in the memory component. One approach to avoiding such data loss in the memory component is to retain a copy of the page of data in an external volatile memory cache such as dynamic random access memory (DRAM) until the page of data is successfully programmed into the nonvolatile storage memory component. Thus, if the programming interval of a page of data fails in the nonvolatile storage memory component causing loss of the page of data within the nonvolatile storage memory component, the page of data may nonetheless be successfully retrieved from the external volatile memory cache. Another approach is to apply an Exclusive-OR process to reconstruct data lost due to a programming interval failure. The data is reconstructed by performing multiple read and read retry operations directed to the bitcell array and processing the read data with Exclusive-OR functions.

BRIEF DESCRIPTION OF THE DRAWINGS

Embodiments of the present disclosure are illustrated by way of example, and not by way of limitation, in the figures of the accompanying drawings in which like reference numerals refer to similar elements.

FIGS. 7A and 7B depict timing diagram for the operations of the storage drive of FIG. 2 in a multipass, multilevel bitcell array embodiment.

DESCRIPTION OF EMBODIMENTS

Figure 1:
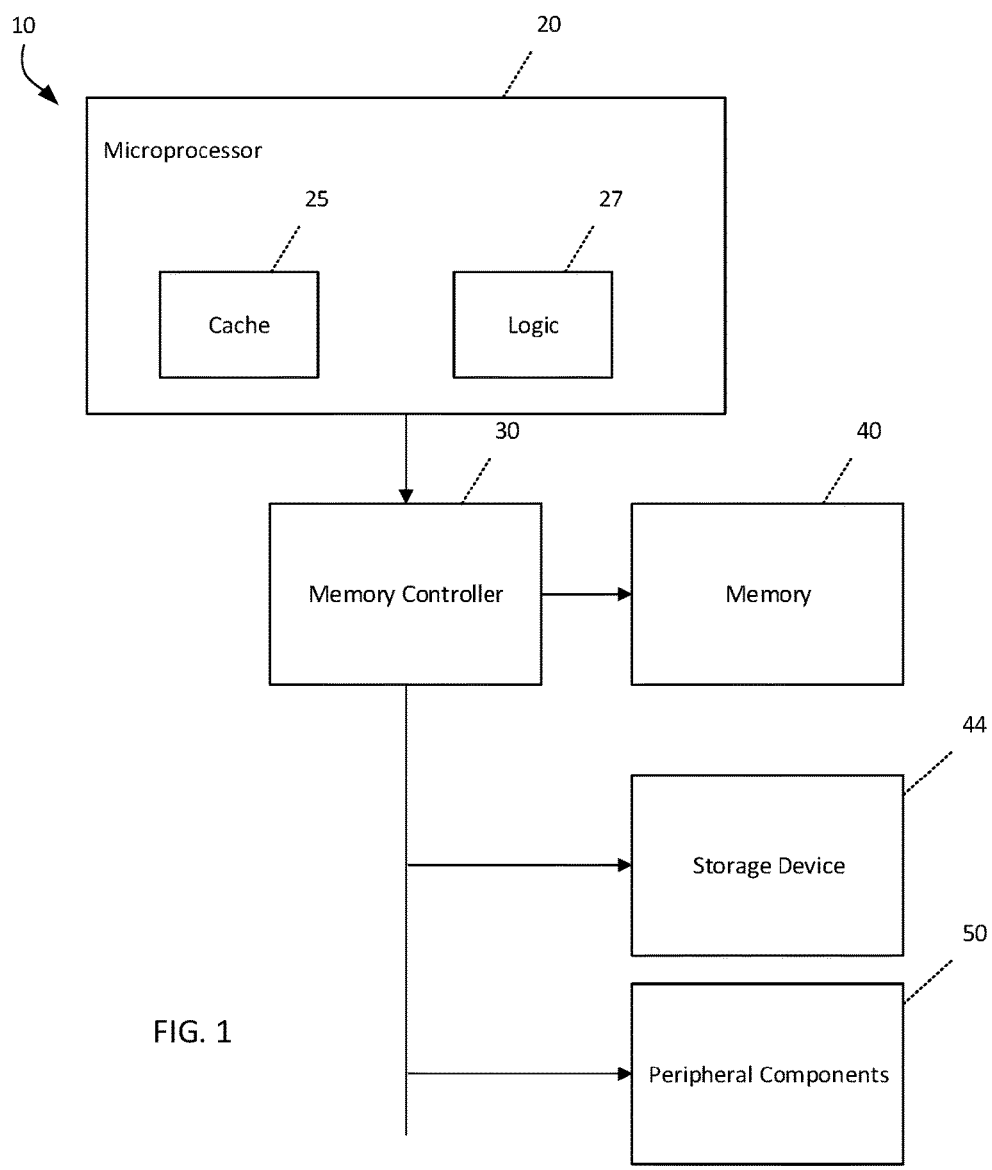
FIG. 1 depicts a high-level block diagram illustrating selected aspects of a system employing a storage drive having data preservation and recovery in accordance with an embodiment of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In some prior nonvolatile memory components, it may not be known whether the programming interval of one page of data was successful until the programming of the next page of write data into the bitcell array has already been initiated. As a result, a failure in the programming of a page of data, may lead to loss of some or all of that page of data. For example, in transferring a page of write data to the bitcell array, the page of write data typically overwrites the prior page stored in a transfer register, losing the prior page of write data. If it is subsequently determined that the programming of the prior page of write data failed, the prior page of write data is no longer available for recovery. Such data loss may be further exacerbated in those memory components which overlap the programming of a current page with the input and caching of the next page to be written into the memory component.

As noted above, one approach to avoiding data loss in the event of a write failure in the memory component is to retain a copy of the page of write data in an external volatile memory cache such as dynamic random access memory (DRAM) until the page of data is successfully programmed into the nonvolatile storage memory component. Thus, if the programming interval of a page of write data fails in the nonvolatile storage memory component causing loss of the page of data within the nonvolatile storage memory component, the page of write data may nonetheless be successfully retrieved from the external volatile memory cache. However, it is appreciated herein that in some systems employing a nonvolatile storage memory components such as solid state drives, the system may not have a DRAM data cache in the write path to the solid state drive.

Similarly, a solid state drive may lack an Exclusive-OR data recovery process to reconstruct data lost due to a programming interval failure. Moreover, the multiple read and read retry operations of such Exclusive-OR data recovery processes can be time consuming, adversely affecting system performance.

In one aspect of the present description, a nonvolatile storage memory component such as a solid state drive or a memory module, for example, includes an internal data preservation and recovery process which is independent of external data caches or time consuming Exclusive-OR data recovery processes. Accordingly, a nonvolatile storage memory component employing an internal data preservation and recovery process in accordance with the present description, can preserve data in the event of a data programming failure notwithstanding that the system lacks an external data cache in the write path to the nonvolatile storage memory component or lacks an Exclusive-OR data recovery process. Also, an internal data recovery process in accordance with the present description can recover data more quickly than many known Exclusive-OR data recovery processes.

For example, a memory controller of a nonvolatile storage memory component such as a solid state drive may employ write logic configured to write a set of write data such as a page of write data, for example, to the bitcell array from a write data register, and to cache the next page of write data in a cache register. The first page of write data is written to, that is programmed into, the bitcell array from the data register. In accordance with one aspect of the present description, data preservation logic of the memory controller is configured to transfer the first page of write data from the write data register to a backup data register before releasing the write data register to be overwritten by the next page of write data from the cache register. As explained below, in one embodiment, the first page of write data remains preserved in the backup register until it has been determined that the first page of write data has been safely programmed into the bitcell array. Thus, the backup register containing the preserved first page of write data is not released to be overwritten until it has been determined that the first page of write data has been safely programmed into the bitcell array.

In another aspect of the present description, data recovery logic of the memory controller is configured to determine whether the first page of write data was successfully written to the bitcell array, and in response to a determination that writing the first page of write data to the bitcell array failed, to output the first page of write data preserved in the backup data register from the storage drive. In one embodiment, the data recovery logic transfers the preserved first page of write data from the backup data register to the cache register and outputs the preserved first page of write data from the cache register. The outputted first page may then be utilized by the memory controller or other logic to program the failed page of write data into the bitcell array at another location or preserved for other purposes.

Thus, in the event of a failure to successfully program the bitcell array with the first page of write data, the first page of write data may be readily recovered since it is preserved in the backup data register. In the event that programming the next or second page of write data into the bitcell array also failed, that next page of write data may be preserved and recovered as well as explained below. However, in the event that the programming of the next page of write data succeeded, the successful programming of that next page is not disturbed and the memory is ready to program additional pages of write data having successfully programmed the second page of write data into the bitcell array.

In one embodiment, the data preservation logic is further configured to preserve the second or next page of write data in the cache register in the event that the writing of the second page of write data also fails. In one embodiment, the data preservation logic releases the data register after the first page has been preserved by safely copying it to the backup data register. The write logic is then free to copy the next set of write data from the cache register to the write data register since the first set of write data has been safely transferred to the backup register. The write logic writes the second, that is the next page of write data from the write data register to the bitcell array. In one aspect of the present description, the data recovery logic is further configured to determine whether the second page of write data was successfully written to the bitcell array, and in response to a determination that writing the second page of write data to the bitcell array failed, output the preserved second page of write data from the cache register. In one embodiment, cache register is then released and the first page of write data is transferred from the backup data register to the cache register and output from the cache register, after the second page of write data is output from the cache register. In this manner, both the first page and second, that is next page of write data may be preserved in the event that the programming of both the first and second pages of programming fails.

Another aspect of data preservation in accordance with the present description is directed to MLC (multiple level cell) memory in which each bitcell has multiple levels capable of storing multiple bits of data. For example, a triple level cell (TLC) is configured to store three bits of data, and a quad level cell (QLC) is configured to store four bits of data. MLC memories frequently store data in the array of MLC bitcells in multiple passes. For example, a TLC memory may store a page of data in one pass and two pages of data in a different pass of a two pass operation. A QLC memory may store two pages of data in one pass and another two pages of data in a second pass of a two pass write operation.

Data preservation logic in accordance with one embodiment of the present description, determines whether the writing of write data to the array of multilevel bitcells in a first pass failed. If so, in response to a determination that the first pass writing of write data to the multilevel bitcell array failed, the second pass of write data to the multilevel bitcell array is aborted to preserve the write data of both the first and second passes in registers of the memory including, for example, a cache register and an appropriate number of data registers. In one embodiment, aborting the programming of the second pass of a multipass write operation preserves the pages of write data of the multipass write operation by preventing overwriting of the write data by a subsequent multipass write operation before the pages of the failed multipass operation are recovered.

In one embodiment of a memory employing multipass write operations in accordance with the present description, the write data preserved in the cache register due to failure of the programming of the first pass, may be output by the memory so that it may be written in another write operation to another memory location or preserved for other purposes. Write data preserved in write data registers due to a failure of the programming of the first pass, may be serially output through the cache register in one embodiment for data rewrite or other purposes.

In this manner, data preservation in accordance with the present description can ensure preservation of all the pages of write data which might otherwise be lost due to a programming failure. A variety of different types of memory may employ data preservation and recovery in accordance with the present description including MLC memories which utilize multipass write operations involving multiple pages of memory in one or more of the passes of the multipass operations. In a similar manner, memory devices which employ overlapping programming of a current page with the input and caching of the next page to be written into the memory component, may also utilize data preservation in accordance with the present description to ensure preservation and recovery of all the pages of write data which might otherwise be lost due to a programming failure. However, it is appreciated that features and advantages of employing data preservation and recovery in a nonvolatile storage memory components in accordance with the present description may vary, depending upon the particular application.

Such components in accordance with embodiments described herein can be used either in stand-alone memory components, or can be embedded in microprocessors and/or digital signal processors (DSPs). Additionally, it is noted that although systems and processes are described herein primarily with reference to microprocessor based systems in the illustrative examples, it will be appreciated that in view of the disclosure herein, certain aspects, architectures, and principles of the disclosure are equally applicable to other types of device memory and logic devices.

Implementations of the described techniques may include hardware, a method or process, or computer software on a computer-accessible medium. Thus, embodiments include corresponding computer systems, apparatus, and computer programs recorded on one or more computer storage devices, each configured to perform the actions of the methods.

Operations described herein are performed by logic which is configured to perform the operations either automatically or substantially automatically with little or no system operator intervention, except where indicated as being performed manually such as user selection. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom Very Large Scale Integrated (VLSI) circuits or gate arrays, off-the-shelf semiconductors such as logic chips, transistors, or other discrete components. A logic element may also be implemented in firmware or programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several non-volatile memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Turning to the figures, FIG. 1 is a high-level block diagram illustrating selected aspects of a system implemented according to an embodiment of the present disclosure. System 10 may represent any of a number of electronic and/or computing devices, that may include a memory device. Such electronic and/or computing devices may include computing devices such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, memory, etc.). In alternative embodiments, system 10 may include more elements, fewer elements, and/or different elements. Moreover, although system 10 may be depicted as comprising separate elements, it will be appreciated that such elements may be integrated on to one platform, such as systems on a chip (SoCs). In the illustrative example, system 10 comprises a central processing unit or microprocessor 20, a memory controller 30, a memory 40, a storage drive 44 and peripheral components 50 which may include, for example, video controller, input device, output device, additional storage, network interface or adapter, battery, etc.

The microprocessor 20 includes a cache 25 that may be part of a memory hierarchy to store instructions and data, and the system memory may include both volatile memory as well as the memory 40 depicted which may include a non-volatile memory. The system memory may also be part of the memory hierarchy. Logic 27 of the microprocessor 20 may include one or more cores, for example. Communication between the microprocessor 20 and the memory 40 may be facilitated by the memory controller (or chipset) 30, which may also facilitate in communicating with the storage drive 44 and the peripheral components 50. The system may include an offload data transfer engine for direct memory data transfers.

Storage drive 44 includes non-volatile storage and may be implemented as, for example, solid-state drives, magnetic disk drives, optical disk drives, storage area network (SAN), network access server (NAS), a tape drive, flash memory, persistent memory domains and other storage devices employing a volatile buffer memory and a nonvolatile storage memory. The storage may comprise an internal storage device or an attached or network accessible storage. The microprocessor 20 is configured to write data in and read data from the memory 40. Programs in the storage are loaded into the memory 40 and executed by the microprocessor 20. A network controller or adapter enables communication with a network, such as an Ethernet, a Fiber Channel Arbitrated Loop, etc. Further, the architecture may, in certain embodiments, include a video controller configured to render information on a display monitor, where the video controller may be embodied on a video card or integrated on integrated circuit components mounted on a motherboard or other substrate. An input device is used to provide user input to the microprocessor 20, and may include a keyboard, mouse, pen-stylus, microphone, touch sensitive display screen, input pins, sockets, or any other activation or input mechanism known in the art. An output device is capable of rendering information transmitted from the microprocessor 20, or other component, such as a display monitor, printer, storage, output pins, sockets, etc. The network adapter may be embodied on a network card, such as a peripheral component interconnect (PCI) card, PCI-express, or some other input/output (I/O) card, or on integrated circuit components mounted on a motherboard or other substrate.

One or more of the components of the device 10 may be omitted, depending upon the particular application. For example, a network router may lack a video controller, for example. Any one or more of the devices of FIG. 1 including the cache 25, memory 40, storage drive 44, system 10, memory controller 30 and peripheral components 50, may include a nonvolatile storage memory component having an internal data preservation and recovery in accordance with the present description.

One example of a nonvolatile storage memory of a nonvolatile storage memory component in accordance with the present description is a 3-dimensional (3D) crosspoint memory, and other types of byte-addressable, write-in-place non-volatile memory. In some embodiments, 3D crosspoint memory may comprise a transistor-less stackable cross point architecture in which memory cells sit at the intersection of word lines and bit lines and are individually addressable and in which bit storage is based on a change in bulk resistance.

In one embodiment, the memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 2:
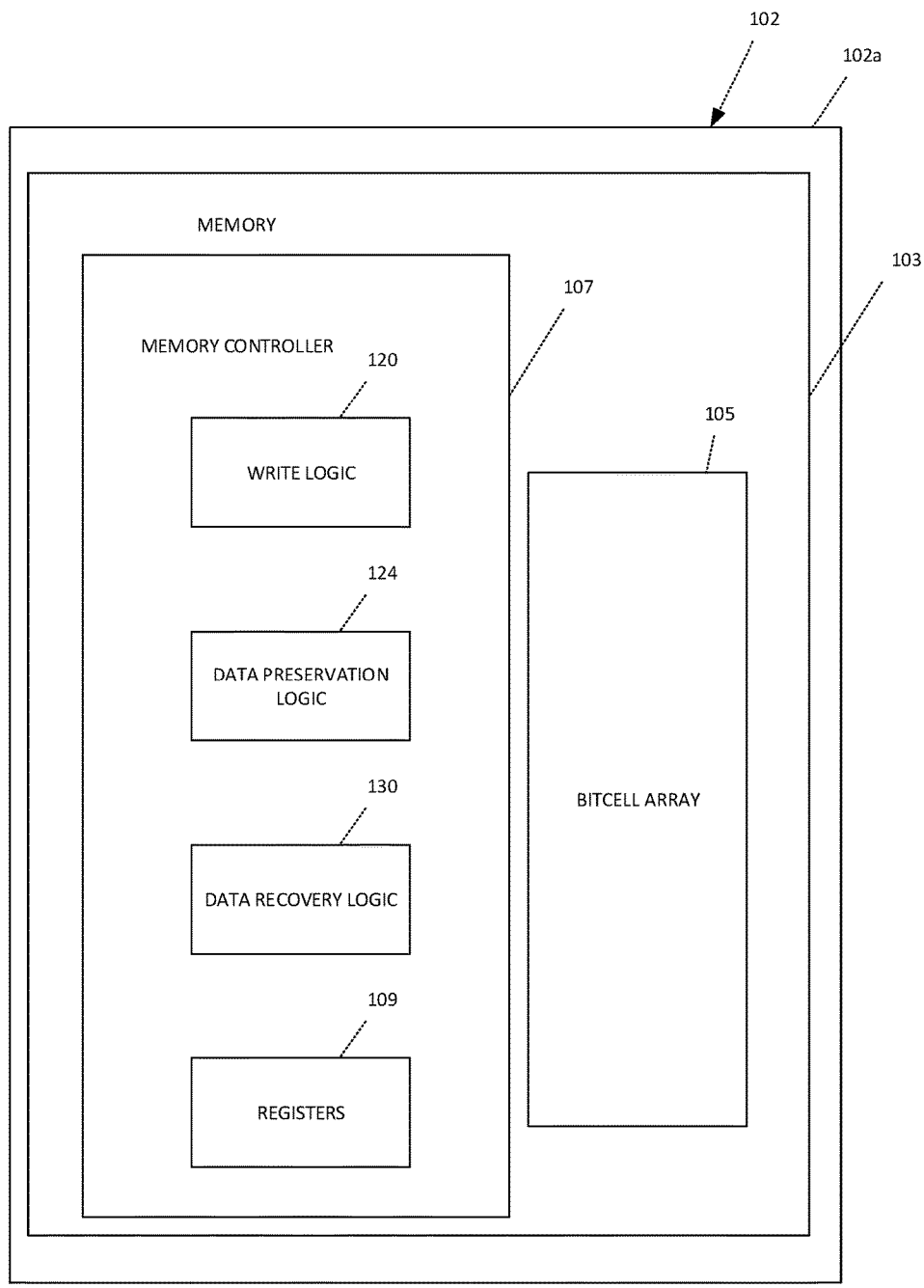
FIG. 2 depicts an example of a storage drive of FIG. 1 employing data preservation and recovery in accordance with an embodiment of the present disclosure.

FIG. 2 shows one example of a nonvolatile storage memory component in accordance with the present description. In this example, the nonvolatile storage memory component is a solid state drive 102 of the storage devices 44 (FIG. 1) of the system 10. The drive 102 has a drive housing 102a which connects the drive 102 to the system 10 as shown in FIG. 1. The drive housing 102a encloses a memory 103 having an array 105 of nonvolatile bitcells configured to store data in a persistent manner, and a memory controller 107 configured to control memory read and memory write operations directed to the bitcell array 105. The memory controller 107 includes a plurality of latches or registers 109 including a cache register 111 (FIG. 3), a write data register 113, and in one embodiment, a backup data register 115.

In one embodiment, the bitcell array 105 may be a single level cell (SLC) memory, a triple level cell (TLC) memory, quad level cell (QLC) memory or other multilevel cell (MLC) memory. In a QLC memory embodiment, the bitcell array 105 may be organized in blocks and planes, such as 736 blocks per plane, for example, 2944 blocks per logical unit (LUN), and 16K bytes per block (plus metadata). It is appreciated that the bitcell array 105 may be organized in units and subunits of other sizes and types, depending upon the particular application.

Figure 3:
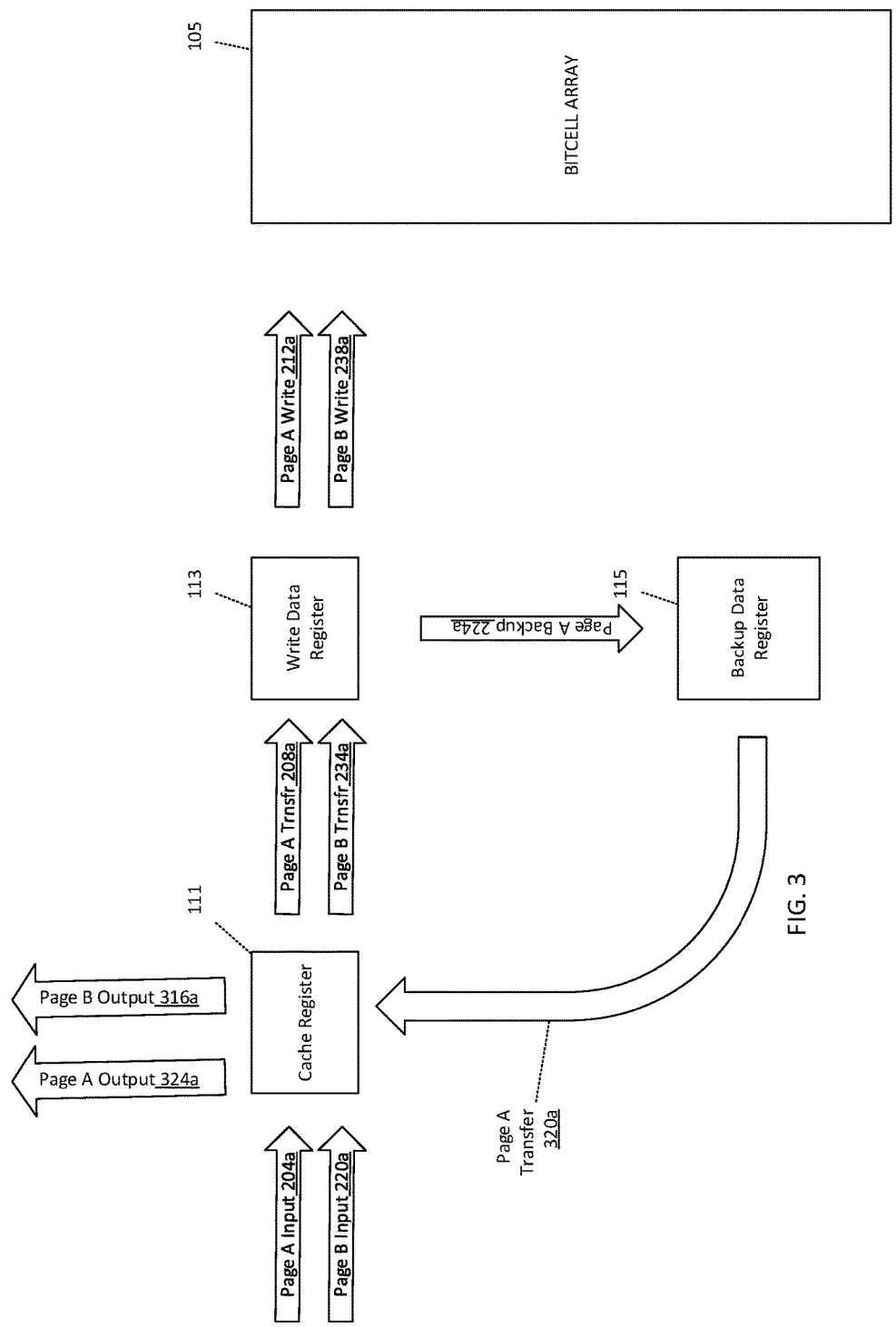
FIG. 3 depicts one example of the operations of the storage drive of FIG. 2 in a single level bitcell array embodiment.

Referring to both FIGS. 2 and 3, the memory controller 107 further includes write logic 120 configured to write a first set of write data such as a first page of data, for example, to the bitcell array 105 from the write data register 113, and to cache a second set of write data such as a second page of data, for example, in the cache register. Data preservation logic 124 of the memory controller 107, is configured to, in one embodiment, transfer the first page of write data from the write data register 113 to the backup data register 115 to preserve the first page of write data in the event of a failure to successfully write the first page of write data to the bitcell array 105.

The write logic 120 is further configured to copy the second page of write data from the cache register to the write data register 113 after the first page of write data is transferred to the backup data register 115. The data preservation logic 124 is further configured to preserve the second page of write data in the cache register 111 in the event of a failure to successfully write the second page of write data to the bitcell array 105.

The memory controller 107 further includes data recovery logic 130 configured to determine whether the first page of write data was successfully written to the bitcell array 105. In response to a determination that writing the first page of write data to the bitcell array failed, the data recovery logic 130 is further configured to output from the drive 102, the first page of write data preserved in the backup data register. In one aspect of the embodiment of FIG. 3, the data recovery logic 130 in outputting the preserved first page of write data from the backup data register, is further configured to transfer the preserved first page of write data from the backup data register 115 to the cache register 111 and output the preserved first page of write data from the cache register 111. The preserved first page of write data may be output by the storage drive 102 to permit the preserved first page of write data to be written to another memory location within the storage drive 102 or for other purposes such as error logging or debugging purposes.

The write logic 120 is further configured to write the second page of write data from the write data register 113 to the bitcell array 105. The data recovery logic 130 is further configured to determine whether the second page of write data was successfully written to the bitcell array 105. In response to a determination that writing the second page of write data to the bitcell array failed, the data recovery logic 130 is further configured to output the preserved second page of write data from the cache register. Accordingly, the data recovery logic 130 is further configured to transfer the preserved first page of write data from the backup data register 115 to the cache register 111 after the preserved second page of write data is output from the cache register in the event that the second page of write data was not successfully written to the bitcell array 105. In this manner, both the first and second pages of write data may be preserved and output from the cache register 111 in turn in the event that both pages of write data failed to be successfully written to the bitcell array 105.

Figure 4:
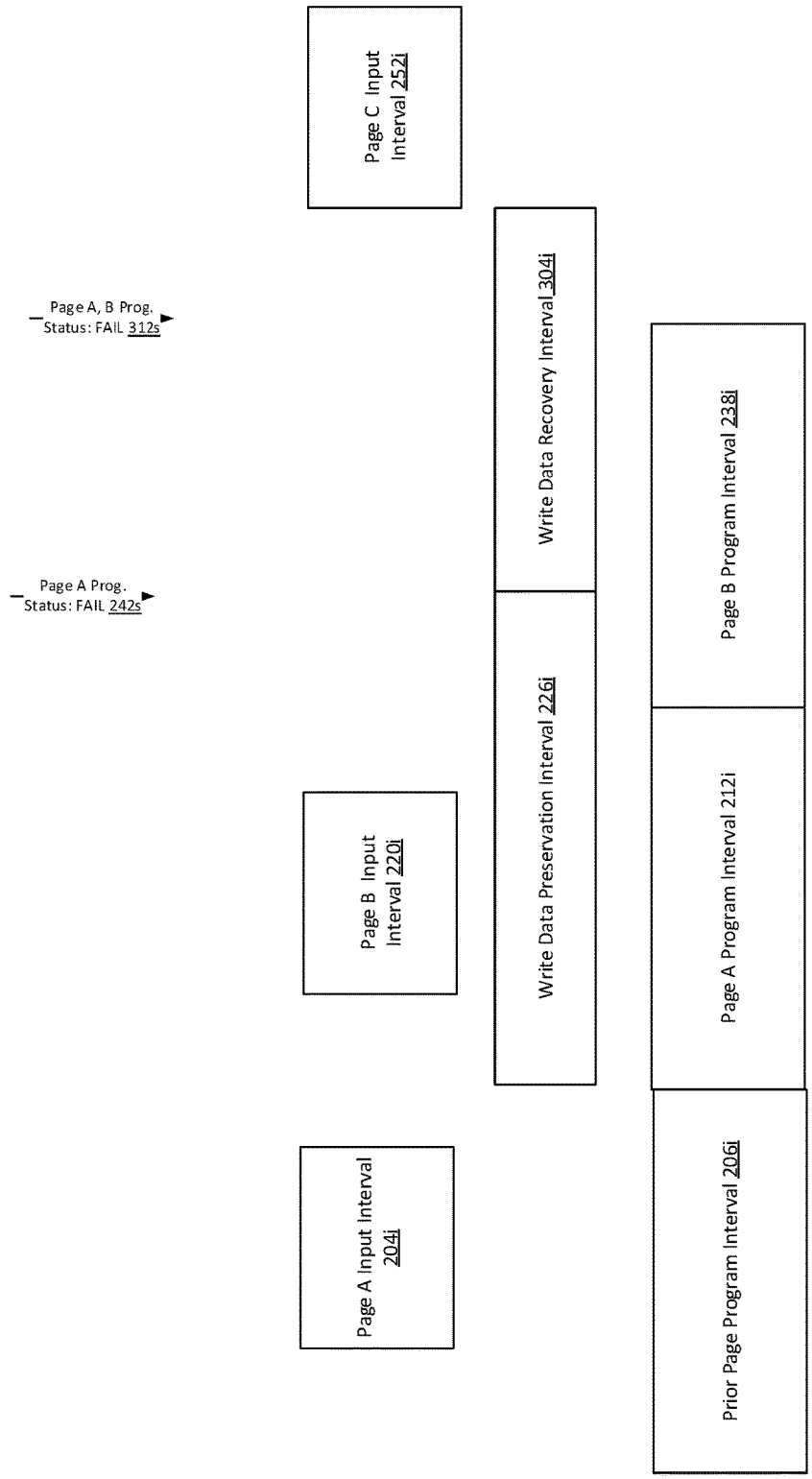
FIG. 4 depicts a timing diagram for the operations of FIG. 3.

In the embodiment of FIG. 3, each bitcell of the array 105 is a single level bitcell configured to store one bit of data. As shown in FIG. 4, write data is written to the bitcell array 105 in overlapping data input and programming intervals in which the programming interval of one page of write data overlaps the input of the next page of write data. It is appreciated that the embodiment of FIG. 3 employing a backup data register to preserve write data may be employed in other types of bitcells such as multilevel bitcells, for example, and in other types of write operations in which the data input and programming intervals may not overlap, for example.

Figure 5:
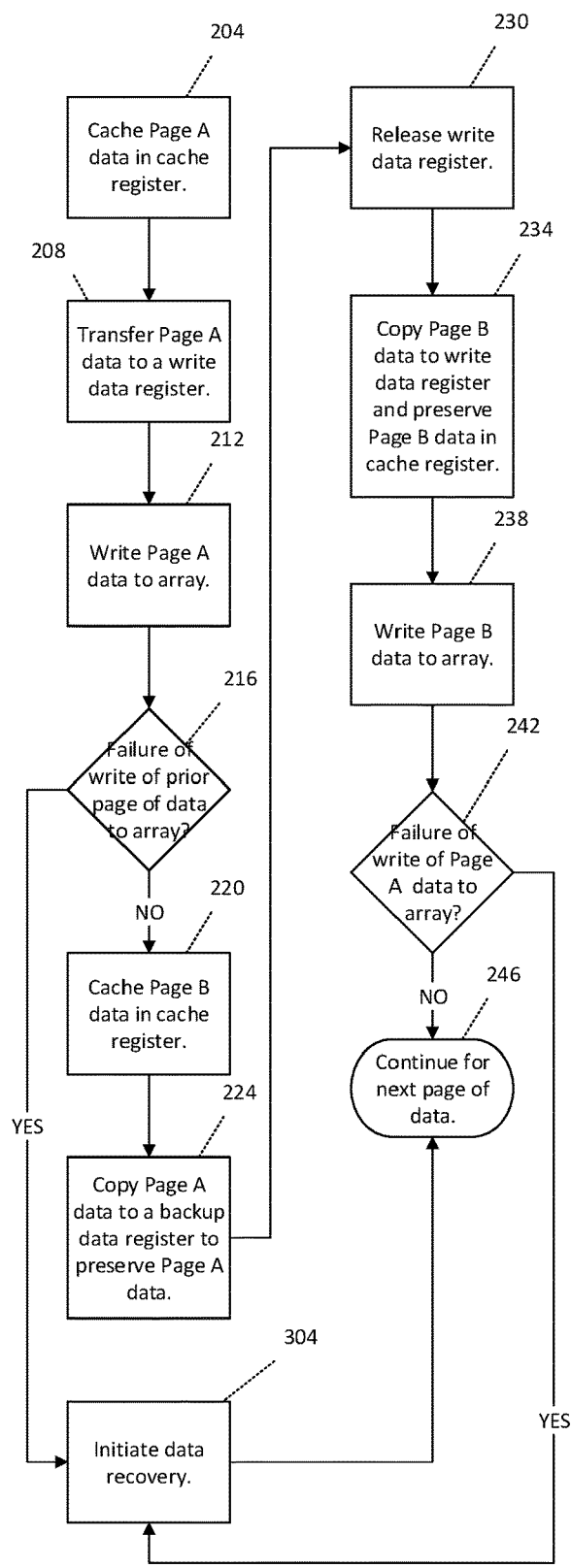
FIG. 5 depicts one example of data preservation operations of the storage drive of FIG. 2.

FIG. 5 depicts one example of operations of the write logic 120 (FIG. 2) in writing write data to the bitcell array 105, and the data preservation logic 124 in preserving write data in the event of a failure to successfully program the write data in the bitcell array 105. Referring generally to FIGS. 2-5, a first set of write data which may be a page of write data referred to herein as Page A, is input and cached (block 204, FIG. 5) by the write data logic 120 in the cache register 111 (FIG. 3) in a write data input interval 204i (FIG. 4) as represented by a write data input arrow 204a (FIG. 3). In this embodiment, the write data input interval 204i for the Page A overlaps a programming interval 206i for a previously input page of write data.

The Page A of write data is transferred (block 208) by the write logic 120 from the cache register 111 to the write data register 113 as represented by the Page A transfer arrow 208a, to be written (block 212) to the bitcell array 105 in the Page A programming interval 212i, as represented by the Page A write arrow 212a. A determination (block 216) is made as to whether there was a failure in the programming of the prior page of write data input to the drive. As explained in greater detail below, detection of such a failure initiates data recovery processes to ensure recovery of the write data.

If it is determined (block 216) that no failure has occurred in the writing of the prior page of write data to the bitcell array 105, the next page of write data, Page B in this example, is input and cached (block 220, FIG. 5) by the write data logic 120 in the cache register 111 (FIG. 3) in a write data input interval 220i (FIG. 4) as represented by a write data input arrow 220a (FIG. 3). In this embodiment, the write data input interval 220i for the Page B overlaps the programming interval 212i for the previously input Page A of write data.

In one aspect of the present description, the write data preservation logic 124 backs up the Page A write data by copying (block 224) the Page A of write data from the write data register 113 to the backup data register 115 to preserve the Page A of write data in the write data preservation interval 226i, as represented by the Page A backup arrow 224a, and then releases (block 230) the write data register 113. The Page A of write data is preserved in the backup data register 115 until it is determined that the Page A of write data was successfully programmed to the bitcell array 105 as described below. The data preservation logic 124 having safely backed up the Page A of write data to the backup register 115 and then released the write data register 113, the write data logic 120 may safely overwrite the write data register 113 with the Page B of write data by copying (block 234) the Page B of write data from the cache register 111 to the write data register 113 as represented by the Page B transfer arrow 234a.

In another aspect of the present description, the write data preservation logic 124 also preserves (block 234) the Page B of write data in the cache register 111 in the write data preservation interval 226i until it is determined whether the programming of Page B to the bitcell array 105 was successful. Accordingly, the cache register 111 is not released to be overwritten with the next page of write data until it is determined whether the programming of Page B to the bitcell array 105 was successful as described below.

Page B of write data is written (block 238) to the bitcell array 105 in the Page B programming interval 238i, as represented by the Page B write arrow 238a. The write data recovery logic 130 determines (block 242) as to whether there was a failure in the programming of the prior page of write data, that is Page A of write data, which was input to the drive.

If it is determined (block 242) that no failure has occurred in the writing of the prior Page A of write data to the bitcell array 105, a data recovery process (block 304) is not initiated in a write data recovery interval 304i. Instead, the next page of write data, Page C in this example, is input (block 246) and cached by the write data logic 120 in the cache register 111 (FIG. 3) in a write data input interval for the Page C in a manner similar to that described above. In one embodiment, before the Page C write data is transferred to the write data register 113 for programming in the bitcell array 105, the Page B of write data may be backed up and preserved in the backup register 115 in a manner similar to that described above in connection with Page A of write data.

Thus, if the Page A of write data was successfully written to the bitcell array 105, the data recovery interval 304i is not initiated and the Page C input interval would have overlapped the programming interval 238i for the previously input Page B of write data in the same manner the Page A input interval 204i overlapped the programming interval 206i for the previously input page of write data. However, in this example of FIG. 4, a failure in the programming of Page A to the bitcell array 105 is detected (block 242, FIG. 5) as indicated by the Page A programming status: FAIL status arrow 242s (FIG. 4). As a result, the data recovery process of the data recovery interval 304i is initiated (block 304, FIGS. 5, 6) to recover one or both of the previously preserved pages of write data. In one embodiment, the data recovery process delays the Page C input interval 252i until the data recovery process as described in connection with FIG. 6, is complete as indicated by the data recovery process interval 304i.

Figure 6:
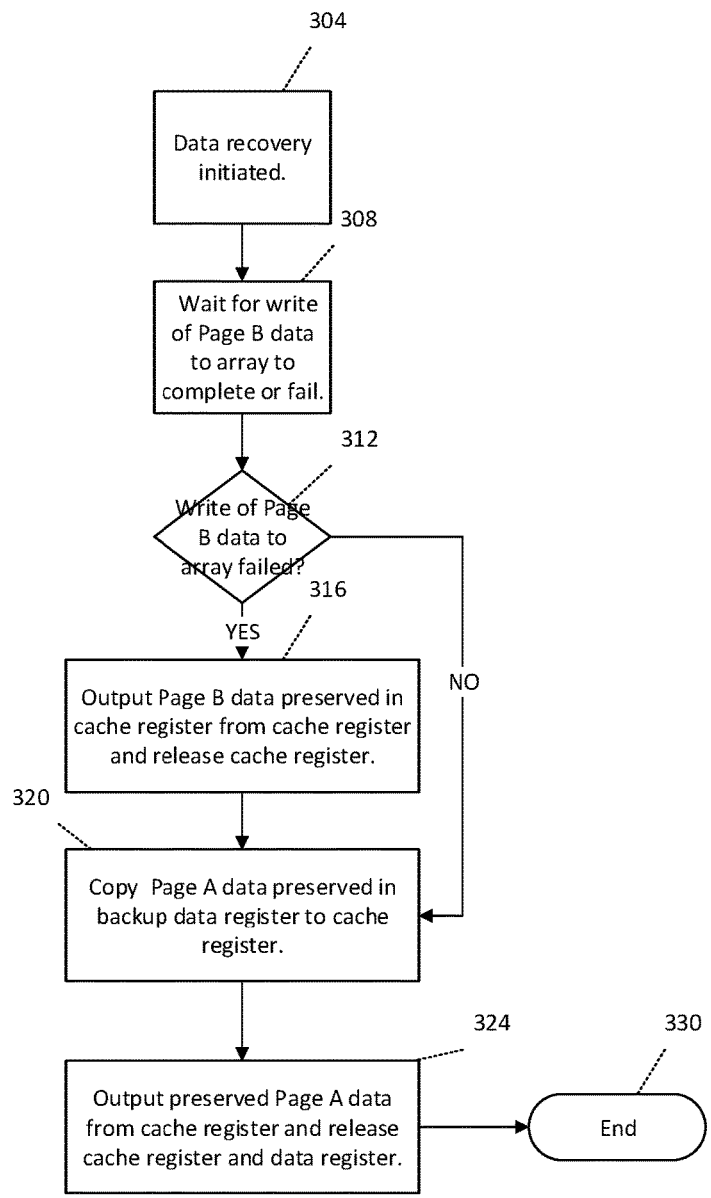
FIG. 6 depicts one example of data recovery operations of the storage drive of FIG. 2.

One example of a data recovery process in accordance with the present description is depicted in FIG. 6. Upon initiation (block 304) of the data recovery process, the data recovery logic 130 waits (block 308) in the write data recovery interval 304i until it can be determined whether the programming of the Page B of write data to the bitcell array 105 was a success or failure. Accordingly, after a suitable wait period, a determination is made (block 312) as to whether the programming of the Page B of write data to the bitcell array 105 failed. In response to a determination (block 312) that the programming of the Page B of write data to the bitcell array 105 did fail as indicated by the Page A, Page B Programming Status: FAIL status arrow 312s (FIG. 4), the data recovery logic outputs (block 316) the preserved Page B of write data as represented by the Page B output arrow 316a in the write data recovery interval 304i. In one type of crosspoint memory, write data may be output from the cache register using a CHANGE READ COL ENHANCED (06h-E0h) command. It is appreciated that other types of commands may be used, depending upon the particular application. In one embodiment, the success/failure status of the programming of the Page A and Page B write data may be indicated by a bit or bits of a status register of the registers 109 (FIG. 2) of the memory controller.

As previously mentioned, the Page B of write data was preserved in the cache register 111 by the data preservation logic 124 to be available to output from the drive 102 in the event that the programming of the Page B of data failed. Having successfully output the preserved Page B of write data from the cache register 111, it is safe for the data recovery logic 130 to release (block 316) the cache register 111 for use in the output of the preserved Page A of write data as described below.

The data recover logic 130 transfers (block 320) the preserved Page A of write data from the backup register 115 to the cache register 111 in the write data recovery interval 304i as represented by the Page A transfer arrow 320a (FIG. 3). In one type of crosspoint memory, write data may be transferred from a data register to the cache register using a SET FEATURE D7h command. It is appreciated that other types of commands may be used, depending upon the particular application. If the Page B of write data was successfully programmed into the bitcell array 105, the data recovery logic 130 may immediately release the cache register 111 to receive the preserved Page A of write data since the preserved Page B of data was not needed for data recovery purposes and may be discarded from the cache register 111 by being overwritten by the Page A of data. Alternatively, if the Page B of data was not successfully programmed into the bitcell array 105, the Page B of write data may be output from the cache register 111 before the cache register 111 is released to receive the Page A of write data as described above.

Having transferred (block 320) the preserved Page A of write data to the cache register 111, the data recovery logic 130 outputs (block 324) from the drive 102, the preserved Page A of write data as represented by the Page A output arrow 324a (FIG. 3) in the write data recovery interval 304i. The output of the Page A of write data and release (block 324) of the cache register 111 terminates (block 330) the data recovery process of the data recovery interval 304i. Accordingly, the next page of write data, Page C in this example, may be safely input and cached in the Page C input interval 252i following termination of the write data recovery interval 304i. The preserved page or pages of write data output (block 316, 324) by the storage drive 102 permits each output preserved page of write data to be written to another memory location within the storage drive 102 or for other purposes such as error logging or debugging purposes.

Data preservation and recovery in accordance with the present description supports a variety of different failure types in the programming of a page of data. For example, the failure may occur in a single tile group, a multi-tile group, a single plane or multiple planes, and the write data may be preserved and recovered as described herein.

Data preservation and recovery in accordance with the present description is compatible with a variety of different storage architectures. For example, in a "fire and forget" architecture in which write data is released from a volatile external cache after being sent to the storage drive, the write data may nonetheless be preserved and recovered in a storage drive employing data preservation and recovery in accordance with the present description. Moreover, system performance may be improved as compared to data recovery processes which employ time consuming multiple read operations such as known Exclusive-OR data recovery techniques.

Another aspect of data preservation in accordance with the present description is directed to MLC (multiple level cell) memory in which each bitcell has multiple levels capable of storing multiple bits of data. In one embodiment, each bitcell of the array 105 (FIG. 2) is a triple level cell (TLC) configured to store three bits of data. In another embodiment, each bitcell of the array 105 (FIG. 2) is a quad level cell (QLC) is configured to store four bits of data.

FIG. 7A depicts an embodiment in which the write logic 120 (FIG. 2) is configured to program write data to the array 105 of multilevel bitcells from registers 109 of the memory controller 107 in a first pass and program write data from registers 109 of the memory controller 107 to the bitcell array 105 in a second pass. For example, a TLC memory 103 may store a page of data such as a lower page (LP) in a first pass at a word line which may be referenced as "WLn," and two pages of data such as an upper page (UP) and an extra page (XP) in a second pass at word line WLn−1, of a two pass write operation. In the next two pass operation, a lower page (LP) is stored at the word line WLn+1, and the upper page (UP) and the extra page (XP) are stored at the world line WLn. Each succeeding two pass operation may be stored at incrementing word lines in this manner. The upper page (UP) and extra page (XP) of write data for the second pass may be input and cached while the lower page (LP) of write data is programmed in the first pass, and vice versa as shown in FIG. 7A.

It is appreciated that the particular pages cached or programmed in the various passes of a multipass operation may vary depending upon the particular application. For example, in one embodiment, the upper page (UP) and extra page (XP) of write data for a first pass may be input and cached while the lower page (LP) of write data is programmed in a second pass, and vice versa.

In one aspect of the present description, the data preservation logic 124 of the memory controller 107 in one embodiment is configured to determine whether programming write data to the bitcell array 105 in the first pass failed, and in response to a determination that programming write data to the bitcell array in the first pass failed, abort programming of write data to the bitcell array in the second pass. As explained in greater detail below, write data of the first and second passes may be preserved in registers 109 of the memory controller 107 instead of being overwritten by pages of a subsequent two pass operation. In one embodiment, the data recovery logic 130 is configured to output from the drive 102, preserved write data of the first and second passes preserved in the registers 109.

In another aspect of the present description, the data preservation logic 124 in preserving write data of the second pass is further configured to preserve write data of the second pass in a cache register 111 (FIG. 8) of the registers 109 (FIG. 1) and the data recovery logic 130 in outputting preserved write data of the second pass is further configured to output preserved write data of the second pass from the cache register 111. Also, the data preservation logic 124 in preserving write data is further configured to preserve write data in a write data register of a plurality of write data registers Register0, Register1 . . . Register3 (FIG. 8) of the registers 109 (FIG. 1) and the data recovery logic 130 in outputting preserved write data is further configured to output preserved write data preserved in a write data register Register0, Register1 . . . Register3 via the cache register 111.

Figure 9:
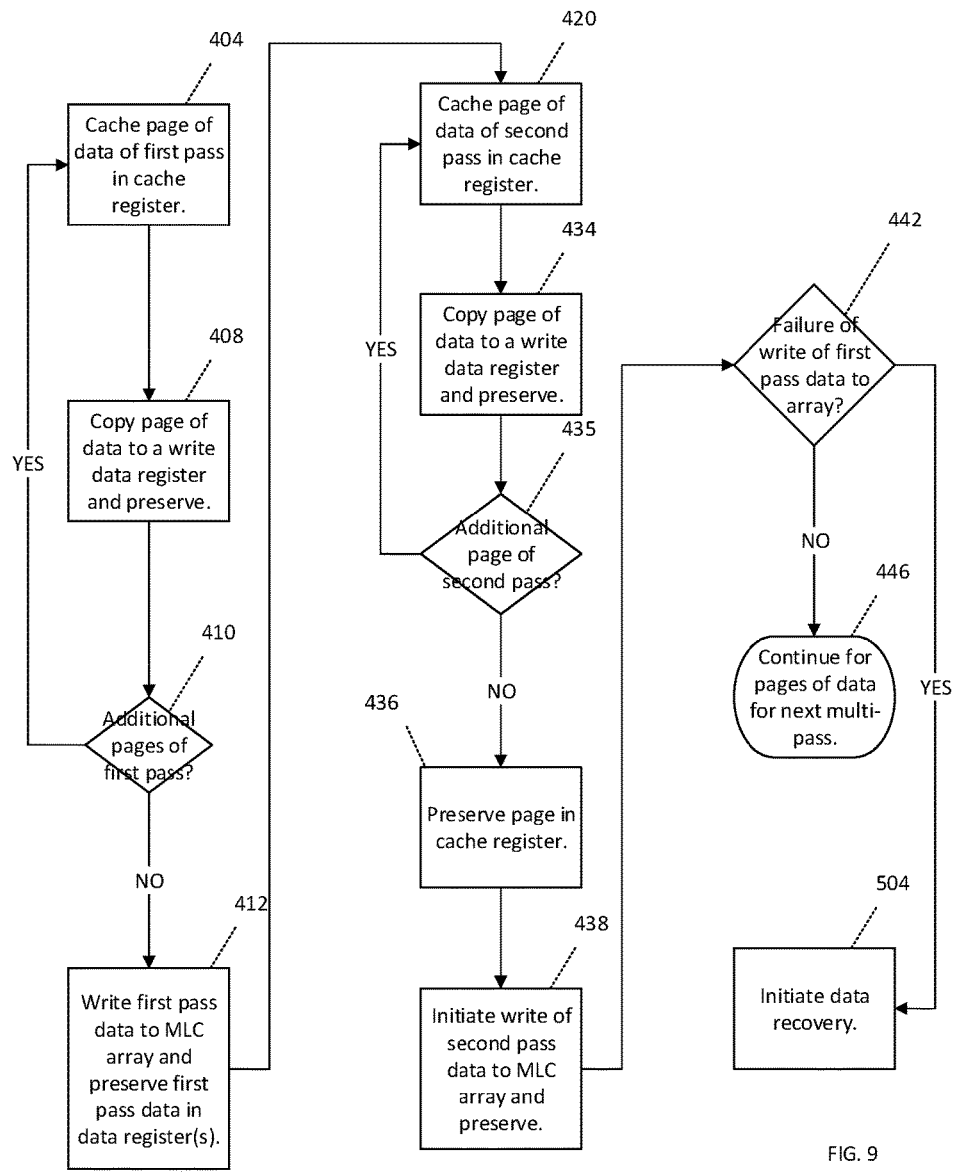
FIG. 9 depicts one example of data preservation operations of the storage drive of FIG. 2 in a multipass, multilevel bitcell array embodiment.

FIG. 9 depicts one example of operations of the write logic 120 (FIG. 2) in writing write data to the bitcell array 105 of a two pass TLC embodiment, and also operations of the data preservation logic 124 in preserving write data in the event of a failure to successfully program the write data in the bitcell array 105 of a two pass TLC embodiment. Although described in connection with a two pass TLC embodiment, it is appreciated herein that data preservation and restoration in accordance with the present description is applicable to other types of multiple pass MLC memory such as a two pass QLC memory for example.

Figure 7B:
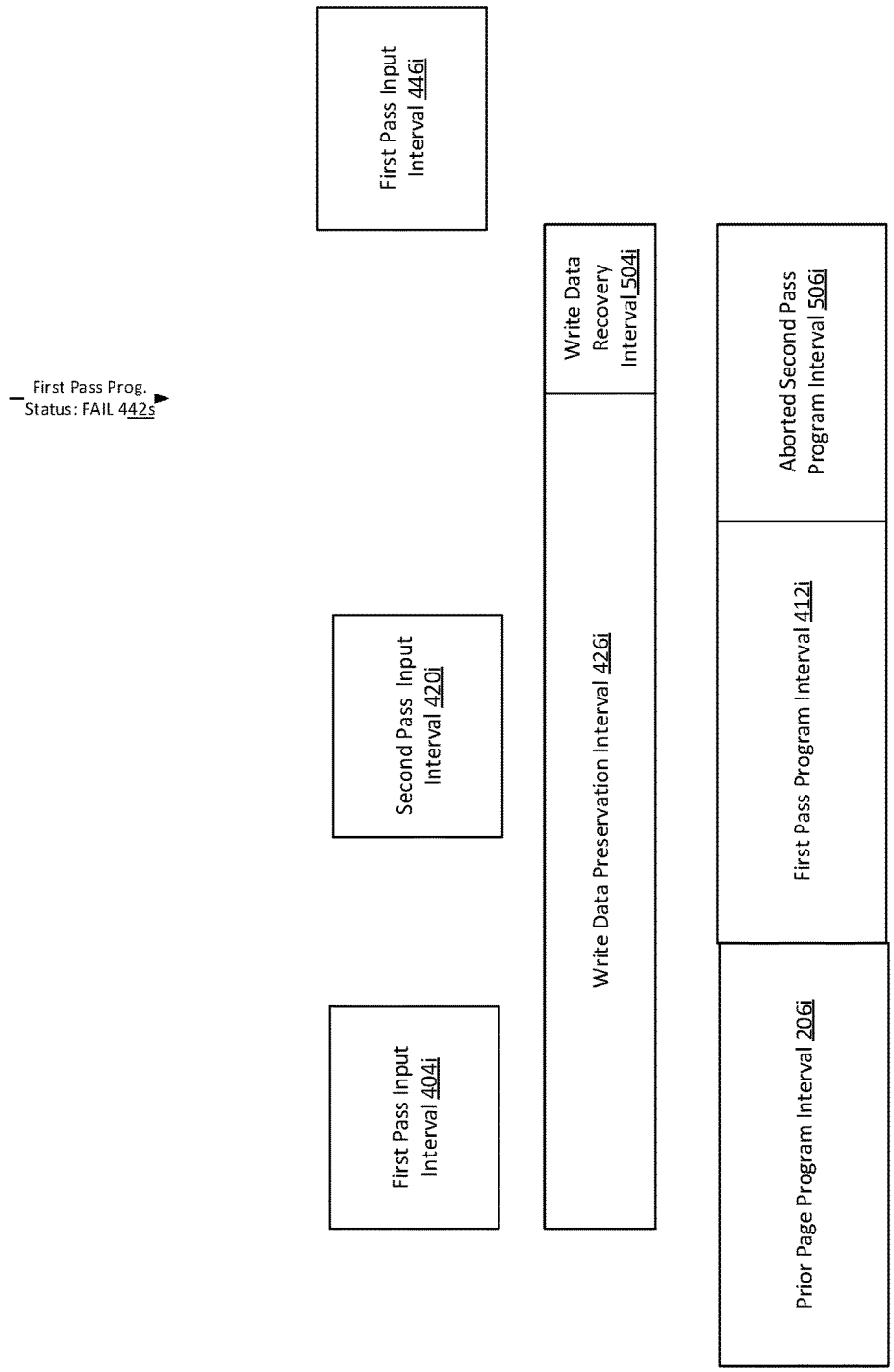
Figure 8:
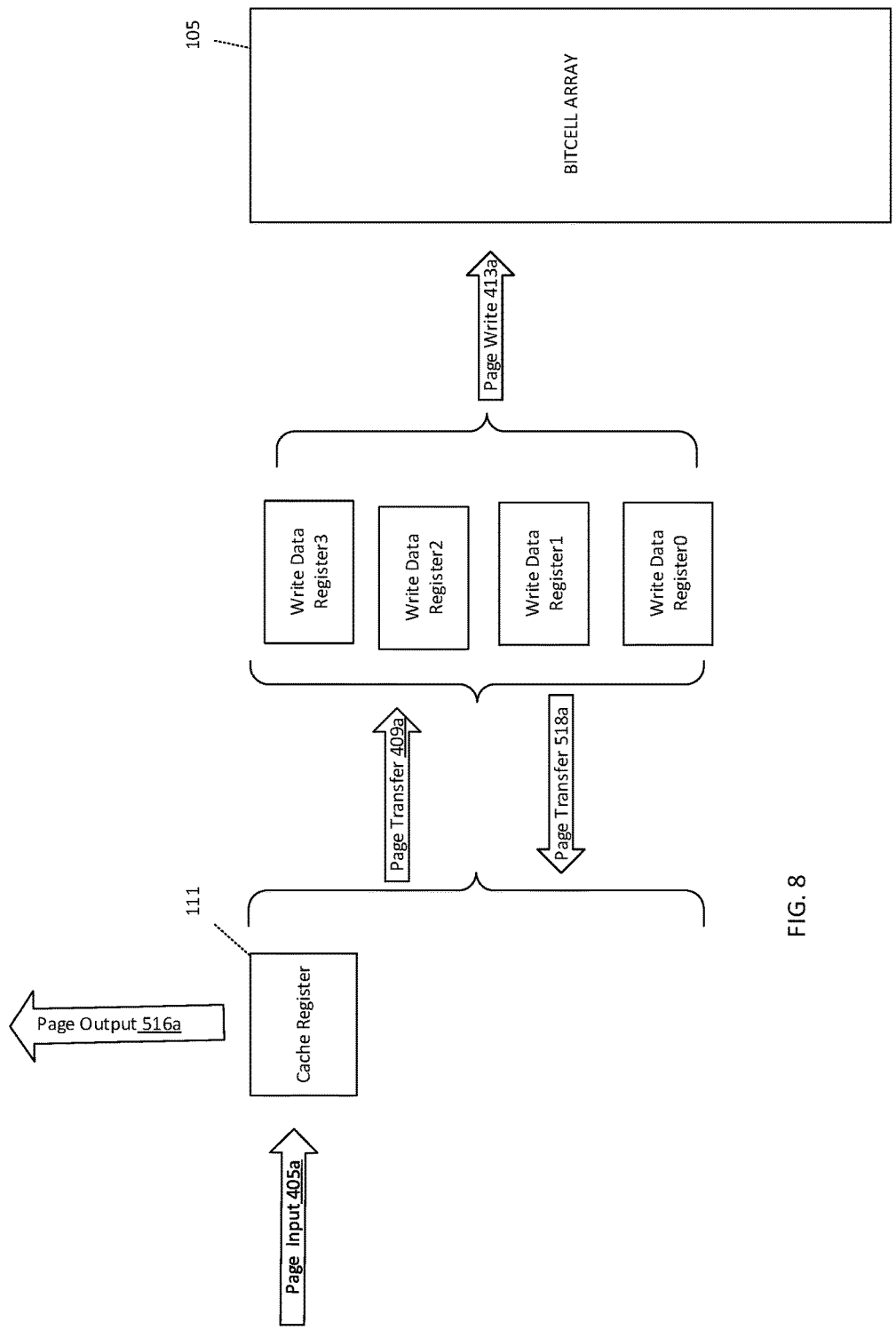
FIG. 8 depicts an example of operations of the storage drive of FIG. 2 in a multipass, multilevel bitcell array embodiment.

Referring generally to FIGS. 2, 6-9, a first set of write data which may be a page of write data referred to herein as Page LP of a first pass of a multipass operation, is input and cached (block 404, FIG. 0) by the write data logic 120 in the cache register 111 (FIG. 8) in a first pass write data input interval 404i (FIG. 7A) as represented by a write data page input arrow 405a (FIG. 8). In this embodiment, the first pass write data input interval 404i for the Page LP of the first pass overlaps a programming interval 406i for previously input page or pages of a prior pass of write data.

The Page LP of write data is transferred (block 408) by the write logic 120 from the cache register 111 to a write data register of the write data registers Register0-Register 3, as represented by the write data page transfer arrow 409a. The transferred page of write data is preserved (block 408) by the data preservation logic 124 in that write data register in the write data preservation interval 426i. The write data of Page LP is preserved until it is determined that the first pass programming was successful as described below. In one embodiment, the Page LP may be written to and preserved in the write data Register2, for example. It is appreciated that the page of write data may be written to and preserved in other write data registers, depending upon the particular application.

In one embodiment, the write logic 120 determines (block 410) whether there are additional pages of write data of the first pass. In this example, the first pass has only one page of write data, the Page LP. Accordingly, the Page LP is written (block 412) from the write data register to the bitcell array 105 in the first pass programming interval 412i, as represented by the page write arrow 413a. In embodiments in which the number of pages of write data in the first pass is fixed at one page in each first pass, the determination of block 410 may be omitted.

Having completed the input of the page or pages of the first pass, a first set of write data which may be a page of write data referred to herein as Page UP of a second pass of a multipass operation, is input and cached (block 420, FIG. 9) by the write data logic 120 in the cache register 111 (FIG. 8) in a second pass write data input interval 420i (FIG. 7A) as represented by a write data page input arrow 405a (FIG. 8). In this embodiment, the second pass write data input interval 420i for the Page UP of the second pass overlaps the first pass programming interval 412i for the previously input Page LP of the prior first pass of write data.

The Page UP of write data is transferred (block 434) by the write logic 120 from the cache register 111 to a write data register of the write data registers Register0-Register 3, as represented by the write data page transfer arrow 409a. The transferred page of write data is preserved (block 434) by the data preservation logic 124 in that write data register in the write data preservation interval 426i until it is determined whether the programming of the first pass was successful. In one embodiment, the Page UP may be written to and preserved in the write data Register0, for example. It is appreciated that the page of write data may be written to and preserved in other write data registers, depending upon the particular application.

The write logic 120 determines (block 435) whether there are additional pages of write data of the second pass. In this example, the second pass has another page of write data, the Page XP in addition to the Page UP. Accordingly, the Page XP of write data of the second pass of a multipass operation, is input and cached (block 420, FIG. 9) by the write data logic 120 in the cache register 111 (FIG. 8) in the second pass write data input interval 420i (FIG. 7A) as represented by a write data page input arrow 405a (FIG. 8). In embodiments in which the number of pages of write data in the second pass is fixed at one page in each second pass, the determination of block 435 may be omitted. In this embodiment, the second pass write data input interval 420*i* for the Page XP (and Page UP) of the second pass overlaps the first pass programming interval 412*i* for the previously input Page LP of the prior first pass of write data.

The Page XP of write data is transferred (block 434) by the write logic 120 from the cache register 111 to a write data register of the write data registers Register0-Register 3, as represented by the write data page transfer arrow 409*a*. The transferred page of write data may be preserved (block 434) by the data preservation logic 124 in that write data register in the write data preservation interval 426*i* until it is determined whether the programming of the first pass was successful.

Having input all the pages of the second pass, the data preservation logic 124 preserves (block 436) the Page XP of write data of the second pass in the cache register 111 in the write data preservation interval 426*i*. Accordingly, the cache register 111 is not released to be overwritten with the next page of write data until it is determined whether the programming of the first pass of write data to the bitcell array 105 was successful as described below. As noted above, the write data preservation logic 124 also preserved the other pages, Page LP of the first pass and Page UP of the second pass in the write data preservation interval 426*i* until it is determined whether the programming of the first pass was successful. Thus, in a similar manner, the write data registers preserving the other pages of write data of the first and second passes are not released to be overwritten with the next page of write data until it is determined whether the programming of the first pass of write data to the bitcell array 105 was successful as described below.

The data preservation logic 124 having safely preserved the pages LP, UP and XP of the first and second passes, the write logic 120 initiates (block 438) the writing of the Page UP and Page XP of the second pass to the bitcell array 105 in the second pass programming interval 438*i*, as represented by the page write arrow 413*a*. The write data recovery logic 130 determines (block 442) as to whether there was a failure in the programming of the first pass of write data, that is Page LP in this example, to the bitcell array 105.

If it is determined (block 442) that no failure has occurred in the writing of the first pass of write data to the bitcell array 105 as indicted by the First Pass Programming Status: Successful status arrow 442*s* (FIG. 7A), a data recovery process (block 504) is not initiated in a write data recovery interval 504*i* (FIG. 7B). Instead, the next pass of write data, the write data of the first pass of another two pass operation is input (block 446) and cached by the write data logic 120 in the cache register 111 (FIG. 8) in a write data input interval 446*i* (FIG. 7A) for the first pass of the next two pass operation in a manner similar to that described above in connection with the first pass input interval 404*i*. Thus, if the first pass write data (Page LP in this example) was successfully written to the bitcell array 105 in the first pass programming interval 412*i*, the first pass input interval 446*i* of the next two pass operation will overlap the second pass programming interval 438*i* for the previously input second pass write data (Page UP, Page XP in this example).

Conversely, if a failure in the programming of the first pass write data (Page LP in this example) to the bitcell array 105 in the first pass programming interval 412*i* is detected (block 442) as indicated by the First Pass programming status: FAIL status arrow 442*s* (FIG. 7B), the data recovery process of the data recovery interval 504*i* (FIG. 7B) is initiated (block 504. FIG. 9) to recover the previously preserved pages of write data of both the first and second passes. In one embodiment, the data recovery process may delay first pass input interval 446*i* of the next two pass operation until the data recovery process as described in connection with FIG. 10, is complete as indicated by the data recovery process interval 504*i* (FIG. 7B).

Figure 10:
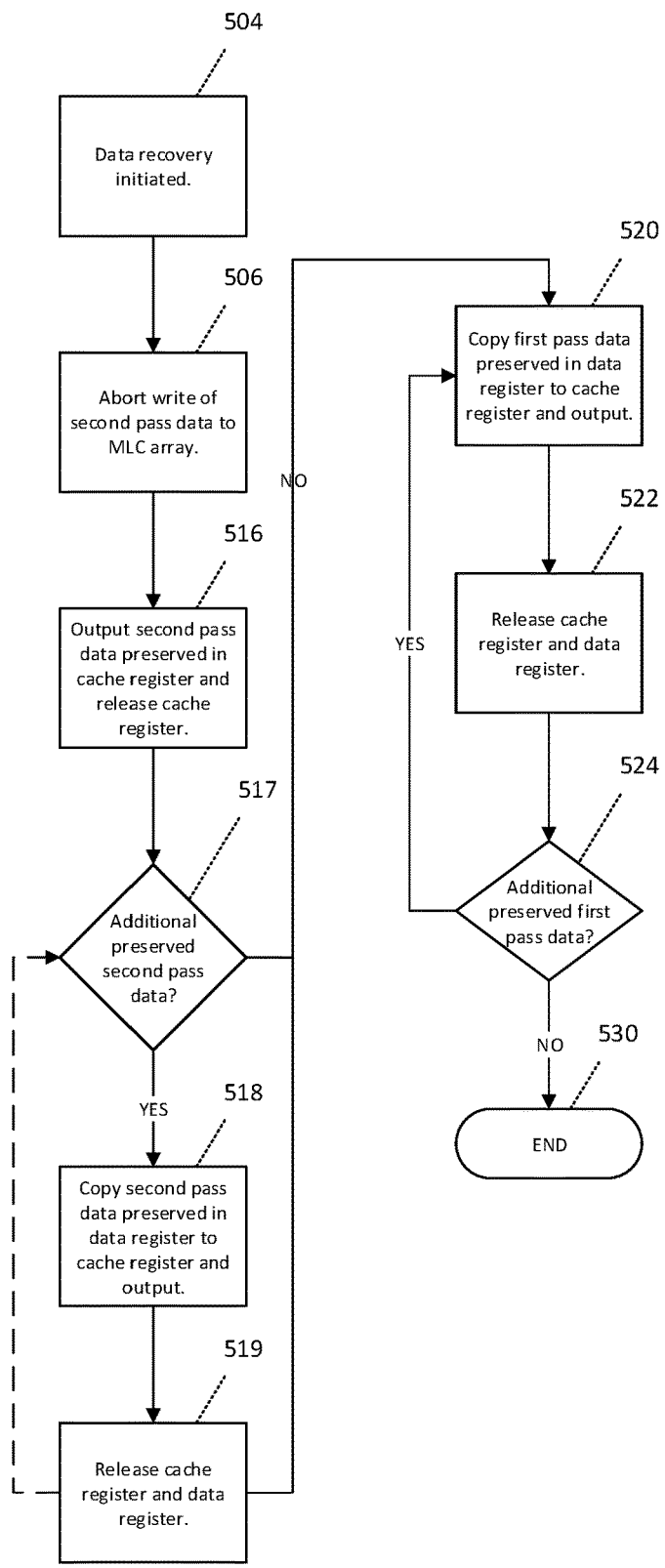
FIG. 10 depicts one example of data recovery operations of the storage drive of FIG. 2 in a multipass, multilevel bitcell array embodiment.

Another example of a data recovery process in accordance with the present description is depicted in FIG. 10. Upon initiation (block 504) of the data recovery process, the data recovery logic 130 aborts (block 506) the second pass programming interval as indicated at 506*i* in FIG. 7B, which stops the programming of the Page UP and Page XP write data of the second pass in the bitcell array 105. In one aspect of the present description, aborting the second pass programming ensures that the preserved pages of write data of the first and second passes may be successfully recovered and output by the drive before the pages of the next two pass operation are input as indicated by the first pass input interval 446*i* (FIG. 7B) of the next two pass operation.

Having aborted the second pass programming operation, the data recovery logic 130 outputs (block 516) the preserved Page XP of write data of the second pass from the cache register 111 as represented by the Page output arrow 516*a* in the write data recovery interval 504*i*. As previously mentioned, the Page XP of write data was preserved in the cache register 111 to be available to output from the drive 102 in the event that the programming of the first pass of write data failed. Having successfully output the preserved Page XP of write data of the second pass from the cache register 111, it is safe for the data recovery logic 130 to release (block 516) the cache register 111 for use in the output of the remaining preserved pages of write data as described below.

The data recover logic 130 determines (block 517) whether there are additional pages of the second pass to be output. In this example, the second pass includes two pages of write data, Page UP and Page XP. As noted above, the preserved Page XP was output from the cache register 111 directly. Accordingly, in this example, it is determined (block 517) that the second pass has another page of preserved write data, that is, preserved Page UP, which is transferred (block 518) by the data recovery logic 130 as represented by the page transfer arrow 518*a*, back to the cache register 111 to be output by the data recovery logic 130 as represented by the page output arrow 516*a*.

Having safely output the preserved Page UP of the second pass, the cache register 111 and the write data register which preserved the Page UP may be safely released (block 519) by the data recovery logic 130. It is appreciated that in other embodiments, the second pass of a multipass operation may have more than two pages of write data. Accordingly, in one embodiment, the data recovery logic may return as indicated in phantom to again determine (block 517) whether the second pass has additional pages to be recovered. Alternatively, in this example, having safely recovered the two preserved pages, Page XP and Page UP which are all the pages of the second pass in this example, the data recovery logic 130 may proceed directly to recover the Page LP of the first pass. In embodiments in which the number of pages of write data in the second pass is fixed at one page in each second pass, the blocks 517-519 may be omitted.

In this example, the preserved Page LP of the first pass which was preserved in a write data register as described above, is transferred (block 520) by the data recovery logic 130 as represented by the page transfer arrow 518*a*, back to the cache register 111 to be output by the data recovery logic 130 as represented by the page output arrow 516*a*. Having safely recovered the preserved Page LP of the first pass, the cache register 111 and the write data register which preserved the Page LP may be safely released (block 522) by the data recovery logic 130. It is appreciated that in other embodiments, the first pass of a multipass operation may have more than one page of write data. Accordingly, in one embodiment, the data recovery logic may determine (block 524) whether the first pass has additional pages to be recovered. Alternatively, in this example, having safely recovered the one preserved Page LP of the first pass in this example, the data recovery logic 130 may terminate the data recovery process of the interval data recovery interval 504*i* as indicated at block 530. In embodiments in which the number of pages of write data in the first pass is fixed at one page in each first pass, the determination of block 524 may be omitted.

Accordingly, the pages of the next two pass operation as indicated by the first pass input interval 446*i* may be safely input and cached without overwriting preserved page data following termination of the write data recovery interval 504*i*. The recovered pages of write data output by the storage drive 102 permits recovered pages to be written to another memory location within the storage drive 102 or for other purposes such as error logging or debugging purposes. Other aspects and advantages may be realized, depending upon the particular application.

Data preservation and recovery in accordance with the present description may be employed by a variety of different multipass, multilevel memories. For example, a TLC memory may store and preserve a pair of pages of data in a first pass, such as an upper page (UP) in a write register such as write register0 (FIG. 8), and a page of write data such as an extra page (XP) in a write data register such as write data register2, for example, and in a second pass, store and preserve a page of write data such as a lower page (LP) in the cache register. The preserved write data may be output through the cache register in a manner similar to that described above.

As another example, a preservation and recovery in accordance with the present description may be employed by a quad level cell (QLC) in which two pages of write data are stored and preserved in write data registers in a first pass, and two pages of write data are stored and preserved in a second pass, in a cache register and a write data register. Other types of memory may employ write data preservation and recovery in accordance with the present description, depending upon the particular application.

EXAMPLES

The following examples pertain to further embodiments.

Example 1 is an apparatus, comprising:

a memory component, the memory component including a bitcell array and a memory controller configured to control memory read and memory write operations directed to the bitcell array, the memory controller including a cache register, a write data register, and a backup register, the memory controller further including:

write logic configured to write a first set of write data to the bitcell array from the write data register, and to cache a second set of write data in a cache register, data preservation logic configured to transfer the first set of write data from the write data register to a backup data register to preserve the first set of write data in event of a failure to successfully write the first set of write data to the bitcell array wherein the write logic is further configured to copy the second set of write data from the cache register to the write data register after the first set of write data is transferred to the backup register, the data preservation logic being further configured to preserve the second set of write data in the cache register, and data recovery logic of the memory controller configured to determine whether the first set of write data was successfully written to the bitcell array, and in response to a determination that writing the first set of write data to the bitcell array failed, output the first set of write data preserved in the backup data register.

In Example 2, the subject matter of Examples 1-8 (excluding the present Example) can optionally include wherein the data recovery logic in outputting the preserved first set of write data from the backup data register, is further configured to transfer the preserved first set of write data from the backup data register to the cache register and output the preserved first set of write data from the cache register.

In Example 3, the subject matter of Examples 1-8 (excluding the present Example) can optionally include wherein the write logic is further configured to cache a third set of write data in the cache register after the preserved first set of write data is output from the cache register.

In Example 4, the subject matter of Examples 1-8 (excluding the present Example) can optionally include wherein:

the write logic is further configured to write the second set of write data from the write data register to the bitcell array, and the data recovery logic is further configured to determine whether the second set of write data was successfully written to the bitcell array, and in response to a determination that writing the second set of write data to the bitcell array failed, output the preserved second set of write data from the cache register.

In Example 5, the subject matter of Examples 1-8 (excluding the present Example) can optionally include the write logic is further configured to cache a third set of write data in the cache register after both outputting the preserved second set of write data from the cache register if writing the second set of write data to the bitcell array failed and after outputting the preserved first set of write data from the cache register.

In Example 6, the subject matter of Examples 1-8 (excluding the present Example) can optionally include wherein the data recovery logic is further configured to transfer the preserved first set of write data from the backup data register to the cache register after the preserved second set of write data is output from the cache register.

In Example 7, the subject matter of Examples 1-8 (excluding the present Example) can optionally include wherein each bitcell of the array is a single level bitcell configured to store one bit of data.

In Example 8, the subject matter of Examples 1-8 (excluding the present Example) can optionally include a system, said system comprising:

a central processing unit, said memory component, and at least one of a display communicatively coupled to the processor, a network interface communicatively coupled to the central processing unit, and a battery coupled to provide power to the system.

Example 9 is a method, comprising:

write logic of a memory controller of a memory component writing a first set of write data to a bitcell array of the memory component from a write data register, the write logic caching a second set of write data in a cache register, data preservation logic of the memory controller transferring the first set of write data from the write data register to a backup data register to preserve the first set of write data in event of a failure to successfully write the first set of write data to the bitcell array, the write logic copying the second set of write data from the cache register to the write data register after the first set of write data is transferred to the backup register and preserving the second set of write data in the cache register, and data recovery logic of the memory controller determining whether the first set of write data was successfully written to the bitcell array, and in response to a determination that writing the first set of write data to the bitcell array failed, outputting the first set of write data preserved in the backup data register.

In Example 10, the subject matter of Examples 9-15 (excluding the present Example) can optionally include wherein the outputting by the data recovery logic of the first set of write data preserved in the backup data register, includes transferring the preserved first set of write data from the backup data register to the cache register and outputting the preserved first set of write data from the cache register.

In Example 11, the subject matter of Examples 9-15 (excluding the present Example) can optionally include:

the write logic caching a third set of write data in the cache register after outputting the preserved first set of write data from the cache register.

In Example 12, the subject matter of Examples 9-15 (excluding the present Example) can optionally include:

the write logic writing the second set of write data from the write data register to the bitcell array, and the data recovery logic determining whether the second set of write data was successfully written to the bitcell array, and in response to a determination that writing the second set of write data to the bitcell array failed, outputting the preserved second set of write data from the cache register.

In Example 13, the subject matter of Examples 9-15 (excluding the present Example) can optionally include:

the write logic caching a third set of write data in the cache register after both outputting the preserved second set of write data from the cache register if writing the second set of write data to the bitcell array failed and after outputting the preserved first set of write data from the cache register.

In Example 14, the subject matter of Examples 9-15 (excluding the present Example) can optionally include wherein the first set of write data preserved in the backup data register is transferred from the backup data register to the cache register after the second set of write data is output from the cache register.

In Example 15, the subject matter of Examples 9-15 (excluding the present Example) can optionally include wherein each bitcell of the array is a single level bitcell configured to store one bit of data.

Example 16 is an apparatus comprising means to perform a method as claimed in any preceding claim.

Example 17 is a system, comprising:

a central processing unit, and a memory component, the memory component including a bitcell array and a memory controller configured to control memory read and memory write operations directed to the bitcell array, the memory controller including a cache register, a write data register, and a backup register, the memory controller further including:

write logic configured to write a first set of write data to the bitcell array from the write data register, and to cache a second set of write data in a cache register, data preservation logic configured to transfer the first set of write data from the write data register to a backup data register to preserve the first set of write data in event of a failure to successfully write the first set of write data to the bitcell array wherein the write logic is further configured to copy the second set of write data from the cache register to the write data register after the first set of write data is transferred to the backup register, the data preservation logic being further configured to preserve the second set of write data in the cache register, and data recovery logic of the memory controller configured to determine whether the first set of write data was successfully written to the bitcell array, and in response to a determination that writing the first set of write data to the bitcell array failed, output the first set of write data preserved in the backup data register.

In Example 18, the subject matter of Examples 17-24 (excluding the present Example) can optionally include wherein the data recovery logic in outputting the preserved first set of write data from the backup data register, is further configured to transfer the preserved first set of write data from the backup data register to the cache register and output the preserved first set of write data from the cache register.

In Example 19, the subject matter of Examples 17-24 (excluding the present Example) can optionally include wherein the write logic is further configured to cache a third set of write data in the cache register after the preserved first set of write data is output from the cache register.

In Example 20, the subject matter of Examples 17-24 (excluding the present Example) can optionally include wherein:

the write logic is further configured to write the second set of write data from the write data register to the bitcell array, and the data recovery logic is further configured to determine whether the second set of write data was successfully written to the bitcell array, and in response to a determination that writing the second set of write data to the bitcell array failed, output the preserved second set of write data from the cache register.

In Example 21, the subject matter of Examples 17-24 (excluding the present Example) can optionally include wherein the write logic is further configured to cache a third set of write data in the cache register after both outputting the preserved second set of write data from the cache register if writing the second set of write data to the bitcell array failed and after outputting the preserved first set of write data from the cache register.

In Example 22, the subject matter of Examples 17-24 (excluding the present Example) can optionally include wherein the data recovery logic is further configured to transfer the preserved first set of write data from the backup data register to the cache register after the preserved second set of write data is output from the cache register.

In Example 23, the subject matter of Examples 17-24 (excluding the present Example) can optionally include wherein each bitcell of the array is a single level bitcell configured to store one bit of data.

In Example 24, the subject matter of Examples 17-24 (excluding the present Example) can optionally include at least one of: a display communicatively coupled to the central processing unit, a network interface communicatively coupled to the central processing unit, and a battery coupled to provide power to the system.

Example 25 is an apparatus, comprising:

a memory component, the memory component including an array of multilevel bitcells, each bitcell configured to store a plurality of bits, and a memory controller configured to control memory read and memory write operations directed to the bitcell array, the memory controller including a plurality of registers including a cache register, and a plurality of write data registers, the memory controller further including:

write logic configured to program write data to an array of multilevel bitcells from registers of the memory controller in a first pass and program write data from registers of the memory controller to the bitcell array in a second pass, data preservation logic of the memory controller configured to determine whether programming write data to the bitcell array in the first pass failed, and in response to a determination that programming write data to the bitcell array in the first pass failed, aborting programming of write data to the bitcell array in the second pass and preserving write data of the first and second passes in registers of the memory controller, and data recovery logic configured to output preserved write data of the first and second passes preserved in the registers.

In Example 26, the subject matter of Examples 25-32 (excluding the present Example) can optionally include wherein the data recovery logic in preserving write data of the second pass is further configured to preserve write data of the second pass in the cache register and the data recovery logic in outputting preserved write data of the second pass is further configured to output preserved write data of the second pass from the cache register.

In Example 27, the subject matter of Examples 25-32 (excluding the present Example) can optionally include wherein the data preservation logic in preserving write data is further configured to preserve write data in a write data register and the data recovery logic in outputting preserved write data is further configured to output preserved write data preserved in a write data register.

In Example 28, the subject matter of Examples 25-32 (excluding the present Example) can optionally include wherein the data recovery logic in outputting preserved write data preserved in a write data register is further configured to, after outputting preserved write data of the second pass from the cache register, transfer preserved write data preserved in a write data register from the write data register to the cache register and the data recovery logic in outputting preserved write data preserved in a write data register is further configured to output the preserved write data transferred to the cache register from the write data register.

In Example 29, the subject matter of Examples 25-32 (excluding the present Example) can optionally include wherein the data recovery logic in preserving write data is further configured to preserve additional write data in a further write data register and the data recovery logic in outputting preserved write data is further configured to, after outputting the preserved write data transferred to the cache register, transfer additional preserved write data preserved in a further write data register from the further write data register to the cache register and output the additional preserved write data transferred to the cache register.

In Example 30, the subject matter of Examples 25-32 (excluding the present Example) can optionally include wherein each bitcell of the array is a triple level bitcell configured to store three bits of data, and wherein the write data of one of the first and second passes includes two sets of write data, and an other of the first and second passes includes one set of write data.

In Example 31, the subject matter of Examples 25-32 (excluding the present Example) can optionally include wherein each bitcell of the array is a quad level bitcell configured to store four bits of data, and wherein the write data of one of the first and second passes includes two sets of write data, and an other of the first and second passes includes two sets of write data.

In Example 32, the subject matter of Examples 25-32 (excluding the present Example) can optionally include a system, said system comprising:

a central processing unit, said memory component, and at least one of a display communicatively coupled to the processor, a network interface communicatively coupled to the central processing unit, and a battery coupled to provide power to the system.

Example 33 is a method, comprising:

write logic of a memory controller of a memory component writing write data to an array of multilevel bitcells from registers of the memory controller in a first pass and writing write data from registers of the memory controller to the bitcell array in a second pass, data preservation logic of the memory controller determining whether the writing of write data to the bitcell array in the first pass failed, and in response to a determination that writing write data to the bitcell array in the first pass failed, aborting the writing of write data to the bitcell array in the second pass and preserving write data of the first and second passes in registers of the memory controller, and data recovery logic outputting the preserved write data of the first and second passes preserved in the registers.

In Example 34, the subject matter of Examples 33-39 (excluding the present Example) can optionally include wherein preserving write data of the second pass includes preserving write data of the second pass in a cache register and outputting preserved write data of the second pass includes outputting preserved write data of the second pass from the cache register.

In Example 35, the subject matter of Examples 33-39 (excluding the present Example) can optionally include wherein preserving write data includes preserving write data in a write data register and outputting preserved write data includes outputting preserved write data preserved in a write data register.

In Example 36, the subject matter of Examples 33-39 (excluding the present Example) can optionally include wherein outputting preserved write data preserved in a write data register includes after outputting preserved write data of the second pass from the cache register, transferring preserved write data preserved in a write data register from the write data register to the cache register and outputting the preserved write data transferred to the cache register from the write data register.

In Example 37, the subject matter of Examples 33-39 (excluding the present Example) can optionally include wherein preserving write data further includes preserving additional write data in a further write data register and outputting preserved write data further includes after outputting the preserved write data transferred to the cache register, transferring additional preserved write data preserved in a further write data register from the further write data register to the cache register and outputting the additional preserved write data transferred to the cache register.

In Example 38, the subject matter of Examples 33-39 (excluding the present Example) can optionally include wherein each bitcell of the array is a triple level bitcell configured to store three bits of data, and wherein the write data of one of the first and second passes includes two sets of write data, and an other of the first and second passes includes one set of write data.

In Example 39, the subject matter of Examples 33-39 (excluding the present Example) can optionally include wherein each bitcell of the array is a quad level bitcell configured to store four bits of data, and wherein the write data of one of the first and second passes includes two sets of write data, and an other of the first and second passes includes two sets of write data.

Example 40 is an apparatus comprising means to perform a method as claimed in any preceding claim.

Example 41 is a system, comprising:
a central processing unit, and
a memory component, the memory component including an array of multilevel bitcells, each bitcell configured to store a plurality of bits, and a memory controller configured to control memory read and memory write operations directed to the bitcell array, the memory controller including a plurality of registers including a cache register, and a plurality of write data registers, the memory controller further including:
write logic configured to program write data to an array of multilevel bitcells from registers of the memory controller in a first pass and program write data from registers of the memory controller to the bitcell array in a second pass,
data preservation logic of the memory controller configured to determine whether programming write data to the bitcell array in the first pass failed, and in response to a determination that programming write data to the bitcell array in the first pass failed, aborting programming of write data to the bitcell array in the second pass and preserving write data of the first and second passes in registers of the memory controller, and
data recovery logic configured to output preserved write data of the first and second passes preserved in the registers.

In Example 42, the subject matter of Examples 40-48 (excluding the present Example) can optionally include wherein the data recovery logic in preserving write data of the second pass is further configured to preserve write data of the second pass in the cache register and the data recovery logic in outputting preserved write data of the second pass is further configured to output preserved write data of the second pass from the cache register.

In Example 43, the subject matter of Examples 40-48 (excluding the present Example) can optionally include wherein the data preservation logic in preserving write data is further configured to preserve write data in a write data register and the data recovery logic in outputting preserved write data is further configured to output preserved write data preserved in a write data register.

In Example 44, the subject matter of Examples 40-48 (excluding the present Example) can optionally include wherein the data recovery logic in outputting preserved write data preserved in a write data register is further configured to, after outputting preserved write data of the second pass from the cache register, transfer preserved write data preserved in a write data register from the write data register to the cache register and the data recovery logic in outputting preserved write data preserved in a write data register is further configured to output the preserved write data transferred to the cache register from the write data register.

In Example 45, the subject matter of Examples 40-48 (excluding the present Example) can optionally include wherein the data recovery logic in preserving write data is further configured to preserve additional write data in a further write data register and the data recovery logic in outputting preserved write data is further configured to, after outputting the preserved write data transferred to the cache register, transfer additional preserved write data preserved in a further write data register from the further write data register to the cache register and output the additional preserved write data transferred to the cache register.

In Example 46, the subject matter of Examples 40-48 (excluding the present Example) can optionally include wherein each bitcell of the array is a triple level bitcell configured to store three bits of data, and wherein the write data of one of the first and second passes includes two sets of write data, and an other of the first and second passes includes one set of write data.

In Example 47, the subject matter of Examples 40-48 (excluding the present Example) can optionally include wherein each bitcell of the array is a quad level bitcell configured to store four bits of data, and wherein the write data of one of the first and second passes includes two sets of write data, and an other of the first and second passes includes two sets of write data.

In Example 48, the subject matter of Examples 40-48 (excluding the present Example) can optionally include further comprising at least one of: a display communicatively coupled to the central processing unit, a network interface communicatively coupled to the central processing unit, and a battery coupled to provide power to the system.

Example 49 is an apparatus, comprising:
a memory component, the memory component including a bitcell array and a memory controller means configured for controlling memory read and memory write operations directed to the bitcell array, the memory controller means including a cache register, a write data register, and a backup register, the memory controller means further including:
write logic means configured for writing a first set of write data to the bitcell array from the write data register, and for caching a second set of write data in a cache register,
data preservation logic means configured for transferring the first set of write data from the write data register to a backup data register to preserve the first set of write data in event of a failure to successfully write the first set of write data to the bitcell array wherein the write logic means is further configured for copying the second set of write data from the cache register to the write data register after the first set of write data is transferred to the backup register, the data preservation logic means being further configured for preserving the second set of write data in the cache register, and
data recovery logic means of the memory controller means configured for determining whether the first set of write data was successfully written to the bitcell array, and in response to a determination that writing the first set of write data to the bitcell array failed, output the first set of write data preserved in the backup data register.

In Example 50, the subject matter of Examples 49-56 (excluding the present Example) can optionally include wherein the data recovery logic means in outputting the preserved first set of write data from the backup data register, is further configured for transferring the preserved first set of write data from the backup data register to the cache register and for outputting the preserved first set of write data from the cache register.

In Example 51, the subject matter of Examples 49-56 (excluding the present Example) can optionally include wherein the write logic means is further configured for caching a third set of write data in the cache register after the preserved first set of write data is output from the cache register.

In Example 52, the subject matter of Examples 49-56 (excluding the present Example) can optionally include wherein:

the write logic means is further configured for writing the second set of write data from the write data register to the bitcell array, and the data recovery logic means is further configured for determining whether the second set of write data was successfully written to the bitcell array, and in response to a determination that writing the second set of write data to the bitcell array failed, for outputting the preserved second set of write data from the cache register.

In Example 53, the subject matter of Examples 49-56 (excluding the present Example) can optionally include wherein the write logic means is further configured for caching a third set of write data in the cache register after both outputting the preserved second set of write data from the cache register if writing the second set of write data to the bitcell array failed and after outputting the preserved first set of write data from the cache register.

In Example 54, the subject matter of Examples 49-56 (excluding the present Example) can optionally include wherein the data recovery logic means is further configured for transferring the preserved first set of write data from the backup data register to the cache register after the preserved second set of write data is output from the cache register.

In Example 55, the subject matter of Examples 49-56 (excluding the present Example) can optionally include wherein each bitcell of the array is a single level bitcell configured to store one bit of data.

In Example 56, the subject matter of Examples 49-56 (excluding the present Example) can optionally include a system, said system comprising:

a central processing unit, said memory component, and at least one of a display communicatively coupled to the processor, a network interface communicatively coupled to the central processing unit, and a battery coupled to provide power to the system.

Example 57 is an apparatus, comprising:

a memory component, the memory component including an array of multilevel bitcells, each bitcell configured to store a plurality of bits, and a memory controller means configured for controlling memory read and memory write operations directed to the bitcell array, the memory controller means including a plurality of registers including a cache register, and a plurality of write data registers, the memory controller means further including:

write logic means configured for programming write data to an array of multilevel bitcells from registers of the memory controller means in a first pass and program write data from registers of the memory controller means to the bitcell array in a second pass, data preservation logic means of the memory controller means configured for determining whether programming write data to the bitcell array in the first pass failed, and in response to a determination that programming write data to the bitcell array in the first pass failed, aborting programming of write data to the bitcell array in the second pass and preserving write data of the first and second passes in registers of the memory controller means, and data recovery logic means configured for outputting preserved write data of the first and second passes preserved in the registers.

In Example 58, the subject matter of Examples 57-64 (excluding the present Example) can optionally include wherein the data recovery logic means in preserving write data of the second pass is further configured for preserving write data of the second pass in the cache register and the data recovery logic means in outputting preserved write data of the second pass is further configured for outputting preserved write data of the second pass from the cache register.

In Example 59, the subject matter of Examples 57-64 (excluding the present Example) can optionally include wherein the data preservation logic means in preserving write data is further configured for preserving write data in a write data register and the data recovery logic means in outputting preserved write data is further configured for outputting preserved write data preserved in a write data register.

In Example 60, the subject matter of Examples 57-64 (excluding the present Example) can optionally include wherein the data recovery logic means in outputting preserved write data preserved in a write data register is further configured for, after outputting preserved write data of the second pass from the cache register, transferring preserved write data preserved in a write data register from the write data register to the cache register and the data recovery logic means in outputting preserved write data preserved in a write data register is further configured for outputting the preserved write data transferred to the cache register from the write data register.

In Example 61, the subject matter of Examples 57-64 (excluding the present Example) can optionally include wherein the data recovery logic means in preserving write data is further configured for preserving additional write data in a further write data register and the data recovery logic means in outputting preserved write data is further configured for, after outputting the preserved write data transferred to the cache register, transferring additional preserved write data preserved in a further write data register from the further write data register to the cache register and outputting the additional preserved write data transferred to the cache register.

In Example 62, the subject matter of Examples 57-64 (excluding the present Example) can optionally include wherein each bitcell of the array is a triple level bitcell configured to store three bits of data, and wherein the write data of one of the first and second passes includes two sets of write data, and an other of the first and second passes includes one set of write data.

In Example 63, the subject matter of Examples 57-64 (excluding the present Example) can optionally include wherein each bitcell of the array is a quad level bitcell configured to store four bits of data, and wherein the write data of one of the first and second passes includes two sets of write data, and an other of the first and second passes includes two sets of write data.

In Example 64, the subject matter of Examples 57-64 (excluding the present Example) can optionally include a system, said system comprising:

a central processing unit, said memory component, and at least one of a display communicatively coupled to the processor, a network interface communicatively coupled to the central processing unit, and a battery coupled to provide power to the system.

Example 65 is a computer program product for a computing system wherein the computer program product comprises a computer readable storage medium having program instructions embodied therewith, the program instructions executable by a processor of the computing system to cause operations, the operations comprising:

write logic of a memory controller of a memory component writing a first set of write data to a bitcell array of the memory component from a write data register, the write logic caching a second set of write data in a cache register, data preservation logic of the memory controller transferring the first set of write data from the write data register to a backup data register to preserve the first set of write data in event of a failure to successfully write the first set of write data to the bitcell array, the write logic copying the second set of write data from the cache register to the write data register after the first set of write data is transferred to the backup register and preserving the second set of write data in the cache register, and data recovery logic of the memory controller determining whether the first set of write data was successfully written to the bitcell array, and in response to a determination that writing the first set of write data to the bitcell array failed, outputting the first set of write data preserved in the backup data register.

In Example 66, the subject matter of Examples 65-70 (excluding the present Example) can optionally include wherein the outputting by the data recovery logic of the first set of write data preserved in the backup data register, includes transferring the preserved first set of write data from the backup data register to the cache register and outputting the preserved first set of write data from the cache register.

In Example 67, the subject matter of Examples 65-70 (excluding the present Example) can optionally include wherein the operations further comprise:

the write logic caching a third set of write data in the cache register after outputting the preserved first set of write data from the cache register.

In Example 68, the subject matter of Examples 65-70 (excluding the present Example) can optionally include wherein the operations further comprise:

the write logic writing the second set of write data from the write data register to the bitcell array, and the data recovery logic determining whether the second set of write data was successfully written to the bitcell array, and in response to a determination that writing the second set of write data to the bitcell array failed, outputting the preserved second set of write data from the cache register wherein the first set of write data preserved in the backup data register is transferred from the backup data register to the cache register after the second set of write data is output from the cache register.

In Example 69, the subject matter of Examples 65-70 (excluding the present Example) can optionally include the operations further comprise:

the write logic caching a third set of write data in the cache register after both outputting the preserved second set of write data from the cache register if writing the second set of write data to the bitcell array failed and after outputting the preserved first set of write data from the cache register.

In Example 70, the subject matter of Examples 65-70 (excluding the present Example) can optionally include wherein each bitcell of the array is a single level bitcell configured to store one bit of data.

Example 71 is a computer program product for a computing system wherein the computer program product comprises a computer readable storage medium having program instructions embodied therewith, the program instructions executable by a processor of the computing system to cause operations, the operations comprising:

write logic of a memory controller of a memory component writing write data to an array of multilevel bitcells from registers of the memory controller in a first pass and writing write data from registers of the memory controller to the bitcell array in a second pass, data preservation logic of the memory controller determining whether the writing of write data to the bitcell array in the first pass failed, and in response to a determination that writing write data to the bitcell array in the first pass failed, aborting the writing of write data to the bitcell array in the second pass and preserving write data of the first and second passes in registers of the memory controller, and data recovery logic outputting the preserved write data of the first and second passes preserved in the registers.

In Example 72, the subject matter of Examples 71-76 (excluding the present Example) can optionally include wherein preserving write data of the second pass includes preserving write data of the second pass in a cache register and outputting preserved write data of the second pass includes outputting preserved write data of the second pass from the cache register.

In Example 73, the subject matter of Examples 71-76 (excluding the present Example) can optionally include wherein preserving write data includes preserving write data in a write data register and outputting preserved write data includes outputting preserved write data preserved in a write data register.

In Example 74, the subject matter of Examples 71-76 (excluding the present Example) can optionally include wherein outputting preserved write data preserved in a write data register includes after outputting preserved write data of the second pass from the cache register, transferring preserved write data preserved in a write data register from the write data register to the cache register and outputting the preserved write data transferred to the cache register from the write data register.

In Example 75, the subject matter of Examples 71-76 (excluding the present Example) can optionally include wherein preserving write data further includes preserving additional write data in a further write data register and outputting preserved write data further includes after outputting the preserved write data transferred to the cache register, transferring additional preserved write data preserved in a further write data register from the further write data register to the cache register and outputting the additional preserved write data transferred to the cache register.

In Example 76, the subject matter of Examples 71-76 (excluding the present Example) can optionally include wherein at least one of: each bitcell of the array is a triple level bitcell configured to store three bits of data, and wherein the write data of one of the first and second passes includes two sets of write data, and an other of the first and second passes includes one set of write data, and each bitcell of the array is a quad level bitcell configured to store four bits of data, and wherein the write data of one of the first and second passes includes two sets of write data, and an other of the first and second passes includes two sets of write data.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching.

What is claimed is:

1. An apparatus, comprising:
a memory component, the memory component including a bitcell array and a memory controller configured to control memory read and memory write operations directed to the bitcell array, the memory controller including a cache register, a write data register, and a backup register, the memory controller further including:
write logic configured to write a first set of write data to the bitcell array from the write data register, and to cache a second set of write data in a cache register;
data preservation logic configured to transfer the first set of write data from the write data register to a backup data register to preserve the first set of write data in event of a failure to successfully write the first set of write data to the bitcell array wherein the write logic is further configured to copy the second set of write data from the cache register to the write data register after the first set of write data is transferred to the backup register, the data preservation logic being further configured to preserve the second set of write data in the cache register; and
data recovery logic of the memory controller configured to determine whether the first set of write data was successfully written to the bitcell array, and in response to a determination that writing the first set of write data to the bitcell array failed, output the first set of write data preserved in the backup data register.

2. The apparatus of claim 1 wherein the data recovery logic in outputting the preserved first set of write data from the backup data register, is further configured to transfer the preserved first set of write data from the backup data register to the cache register and output the preserved first set of write data from the cache register.

3. The apparatus of claim 2 wherein the write logic is further configured to cache a third set of write data in the cache register after the preserved first set of write data is output from the cache register.

4. The apparatus of claim 1 wherein:
the write logic is further configured to write the second set of write data from the write data register to the bitcell array; and
the data recovery logic is further configured to determine whether the second set of write data was successfully written to the bitcell array, and in response to a determination that writing the second set of write data to the bitcell array failed, output the preserved second set of write data from the cache register.

5. The apparatus of claim 4 wherein the write logic is further configured to cache a third set of write data in the cache register after both outputting the preserved second set of write data from the cache register if writing the second set of write data to the bitcell array failed and after outputting the preserved first set of write data from the cache register.

6. The apparatus of claim 4 wherein the data recovery logic is further configured to transfer the preserved first set of write data from the backup data register to the cache register after the preserved second set of write data is output from the cache register.

7. The apparatus of claim 1 wherein each bitcell of the bitcell array is a single level bitcell configured to store one bit of data.

8. A method, comprising:
write logic of a memory controller of a memory component writing a first set of write data to a bitcell array of the memory component from a write data register;
the write logic caching a second set of write data in a cache register;
data preservation logic of the memory controller transferring the first set of write data from the write data register to a backup data register to preserve the first set of write data in event of a failure to successfully write the first set of write data to the bitcell array;

the write logic copying the second set of write data from the cache register to the write data register after the first set of write data is transferred to the backup data register and preserving the second set of write data in the cache register; and data recovery logic of the memory controller determining whether the first set of write data was successfully written to the bitcell array, and in response to a determination that writing the first set of write data to the bitcell array failed, outputting the first set of write data preserved in the backup data register.

9. The method of claim 8 wherein the outputting by the data recovery logic of the first set of write data preserved in the backup data register, includes transferring the preserved first set of write data from the backup data register to the cache register and outputting the preserved first set of write data from the cache register.

10. The method of claim 8 further comprising:
the write logic caching a third set of write data in the cache register after outputting the preserved first set of write data from the cache register.

11. The method of claim 9 further comprising:
the write logic writing the second set of write data from the write data register to the bitcell array; and
the data recovery logic determining whether the second set of write data was successfully written to the bitcell array, and in response to a determination that writing the second set of write data to the bitcell array failed, outputting the preserved second set of write data from the cache register.

12. The method of claim 11 further comprising:
the write logic caching a third set of write data in the cache register after both outputting the preserved second set of write data from the cache register if writing the second set of write data to the bitcell array failed and after outputting the preserved first set of write data from the cache register.

13. The method of claim 11 wherein the first set of write data preserved in the backup data register is transferred from the backup data register to the cache register after the second set of write data is output from the cache register.

14. The method of claim 8 wherein each bitcell of the bitcell array is a single level bitcell configured to store one bit of data.

15. A system, comprising:
a central processing unit; and
a memory component, the memory component including a bitcell array and a memory controller configured to control memory read and memory write operations directed to the bitcell array, the memory controller including a cache register, a write data register, and a backup register, the memory controller further including:
write logic configured to write a first set of write data to the bitcell array from the write data register, and to cache a second set of write data in a cache register;
data preservation logic configured to transfer the first set of write data from the write data register to a backup data register to preserve the first set of write data in event of a failure to successfully write the first set of write data to the bitcell array wherein the write logic is further configured to copy the second set of write data from the cache register to the write data register after the first set of write data is transferred to the backup register, the data preservation logic being further configured to preserve the second set of write data in the cache register; and
data recovery logic of the memory controller configured to determine whether the first set of write data was successfully written to the bitcell array, and in response to a determination that writing the first set of write data to the bitcell array failed, output the first set of write data preserved in the backup data register.

16. The system of claim 15 wherein the data recovery logic in outputting the preserved first set of write data from the backup data register, is further configured to transfer the preserved first set of write data from the backup data register to the cache register and output the preserved first set of write data from the cache register.

17. The system of claim 16 wherein the write logic is further configured to cache a third set of write data in the cache register after the preserved first set of write data is output from the cache register.

18. The system of claim 15 wherein:
the write logic is further configured to write the second set of write data from the write data register to the bitcell array; and
the data recovery logic is further configured to determine whether the second set of write data was successfully written to the bitcell array, and in response to a determination that writing the second set of write data to the bitcell array failed, output the preserved second set of write data from the cache register.

19. The system of claim 18 wherein the write logic is further configured to cache a third set of write data in the cache register after both outputting the preserved second set of write data from the cache register if writing the second set of write data to the bitcell array failed and after outputting the preserved first set of write data from the cache register.

20. The system of claim 18 wherein the data recovery logic is further configured to transfer the preserved first set of write data from the backup data register to the cache register after the preserved second set of write data is output from the cache register.

21. The system of claim 15 wherein each bitcell of the bitcell array is a single level bitcell configured to store one bit of data.

22. The system of claim 15 further comprising at least one of: a display communicatively coupled to the central processing unit, a network interface communicatively coupled to the central processing unit, and a battery coupled to provide power to the system.

* * * * *